(12) United States Patent
Park et al.

(10) Patent No.: US 6,389,322 B1
(45) Date of Patent: May 14, 2002

(54) REMOTE MANUFACTURE OF FURNITURE COVERS

(75) Inventors: Thomas Michael Park, Woy Woy; Robert Geoffrey Park, Drummoyne, both of (AU)

(73) Assignee: Cameleon Loose Covers Pty Ltd., Druumoyne (AU)

( * ) Notice: Subject to any disclaimer, the term of this patent is extended or adjusted under 35 U.S.C. 154(b) by 0 days.

(21) Appl. No.: 09/172,046

(22) Filed: Oct. 6, 1998

(30) Foreign Application Priority Data

Jun. 2, 1997 (AU) ............................................. PO7114
Jun. 2, 1998 (WO) ............................... PCT/AU98/00410

(51) Int. Cl.⁷ ........................... G06F 19/00; G06T 17/00
(52) U.S. Cl. ......................... 700/98; 700/118; 700/131; 700/134; 703/2; 345/420; 345/442
(58) Field of Search ............................ 700/97, 98, 118, 700/131, 132, 134, 135; 345/420, 441, 442, 443; 703/2

(56) References Cited

U.S. PATENT DOCUMENTS

| | | | | |
|---|---|---|---|---|
| 3,682,063 A | * | 8/1972 | Discus, Jr. et al. | 396/327 |
| 4,149,246 A | | 4/1979 | Goldman | 700/132 |
| 4,546,434 A | | 10/1985 | Gioello | 700/90 |
| 5,107,444 A | | 4/1992 | Wu | 345/419 |
| 5,255,352 A | | 10/1993 | Falk | 345/425 |
| 5,488,699 A | * | 1/1996 | Hanson, Jr. | 345/419 |
| 5,548,519 A | * | 8/1996 | Park et al. | 700/135 |
| 5,552,995 A | * | 9/1996 | Sebastian | 700/97 |
| 5,566,281 A | * | 10/1996 | Tokumasu et al. | 345/420 |
| 5,615,318 A | | 3/1997 | Matsuura | 345/420 |

FOREIGN PATENT DOCUMENTS

EP 0659356 A2 6/1995

OTHER PUBLICATIONS

Park, Thomas Michael, "Patent Process Application" Oct. 7, 1997—two pages of text and two sheets of drawings.

* cited by examiner

*Primary Examiner*—William Grant
*Assistant Examiner*—Paul Rodriguez
(74) *Attorney, Agent, or Firm*—Alfred M. Walker; Harvey Lunenfeld

(57) ABSTRACT

A method of remotely manufacturing a cover for an article, such as a piece of upholstered furniture includes the steps of: ascertaining dimensional data of the article, and relating the data to individual portions of the article, determining a group of physically inter-related templates associated with these individual portions. Each template is definable on a plane of co-oridinates and is derived from a series of mathematical functions evaluated using this data, and using each template to form a corresponding cover piece and joining the cover pieces to form the cover for the furniture article.

15 Claims, 49 Drawing Sheets

Microfiche Appendix Included
(1 Microfiche, 30 Pages)

| HEIGHT DIMENSIONS | MEASUREMENTS |
|---|---|
| Floor to 1 | ............ |
| Floor to 2 | ............ |
| Floor to 3 | ............ |
| Floor to P | ............ |
| 7 to P₁ | ............ |
| 8 to P₁ | ............ |
| 9 to P₁ | ............ |

| WIDTH DIMENSIONS | MEASUREMENTS |
|---|---|
| 1 to 1 | ............ |
| 2 to 2 | ............ |
| 3 to 3 | ............ |
| P to P (curve) | ............ |
| P₁ to P₁ (curve) | ............ |
| 7 to 7 (curve) | ............ |
| 9 to 9 (curve) | ............ |
| 15 to 15 (curve) | ............ |
| 16 to 16 (curve) | ............ |

FRONT ELEVATION OF LOUNGE

Figure 2A(1)
*(Prior Art)*

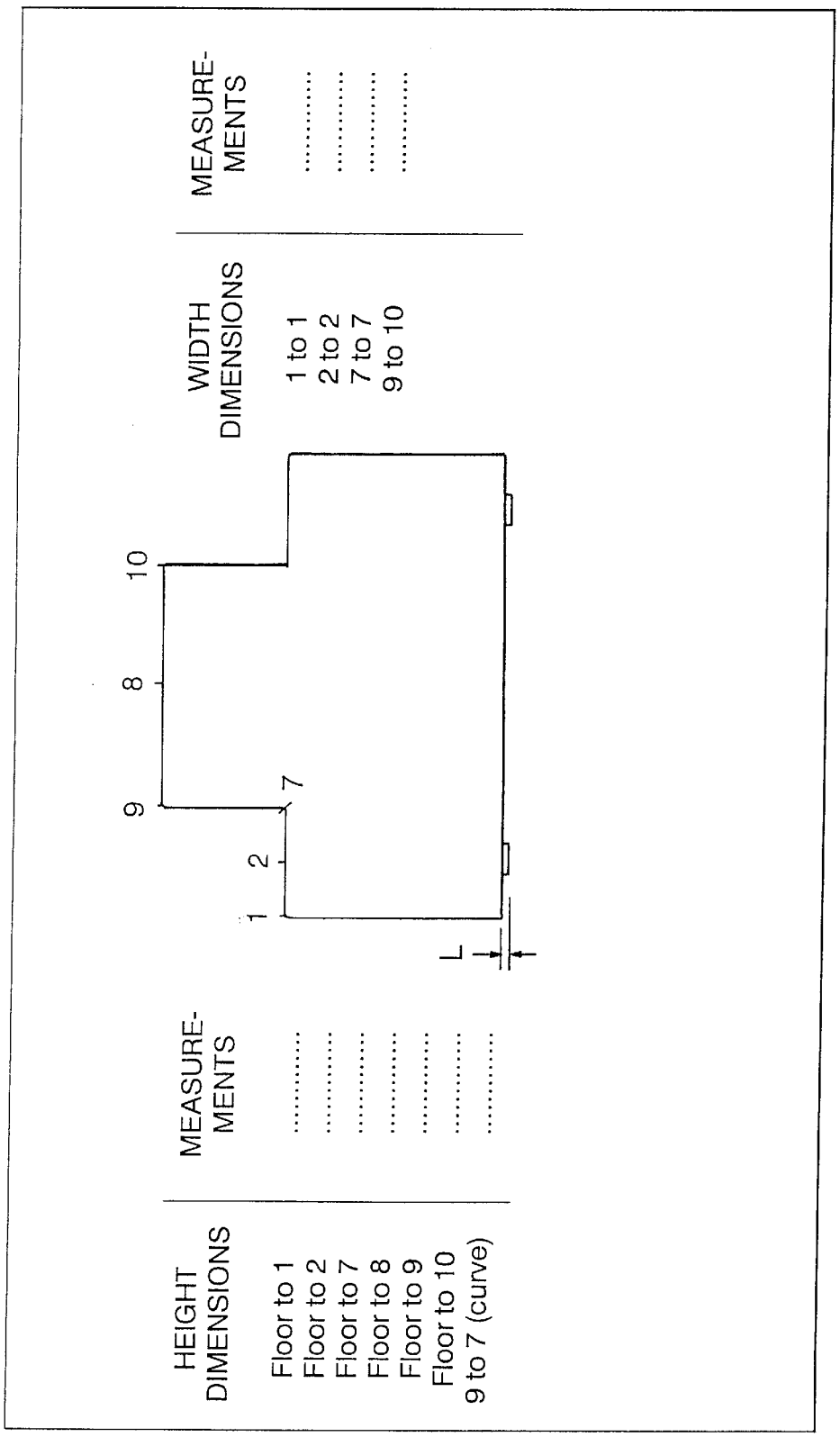
Figure 2A(2)
(Prior Art)

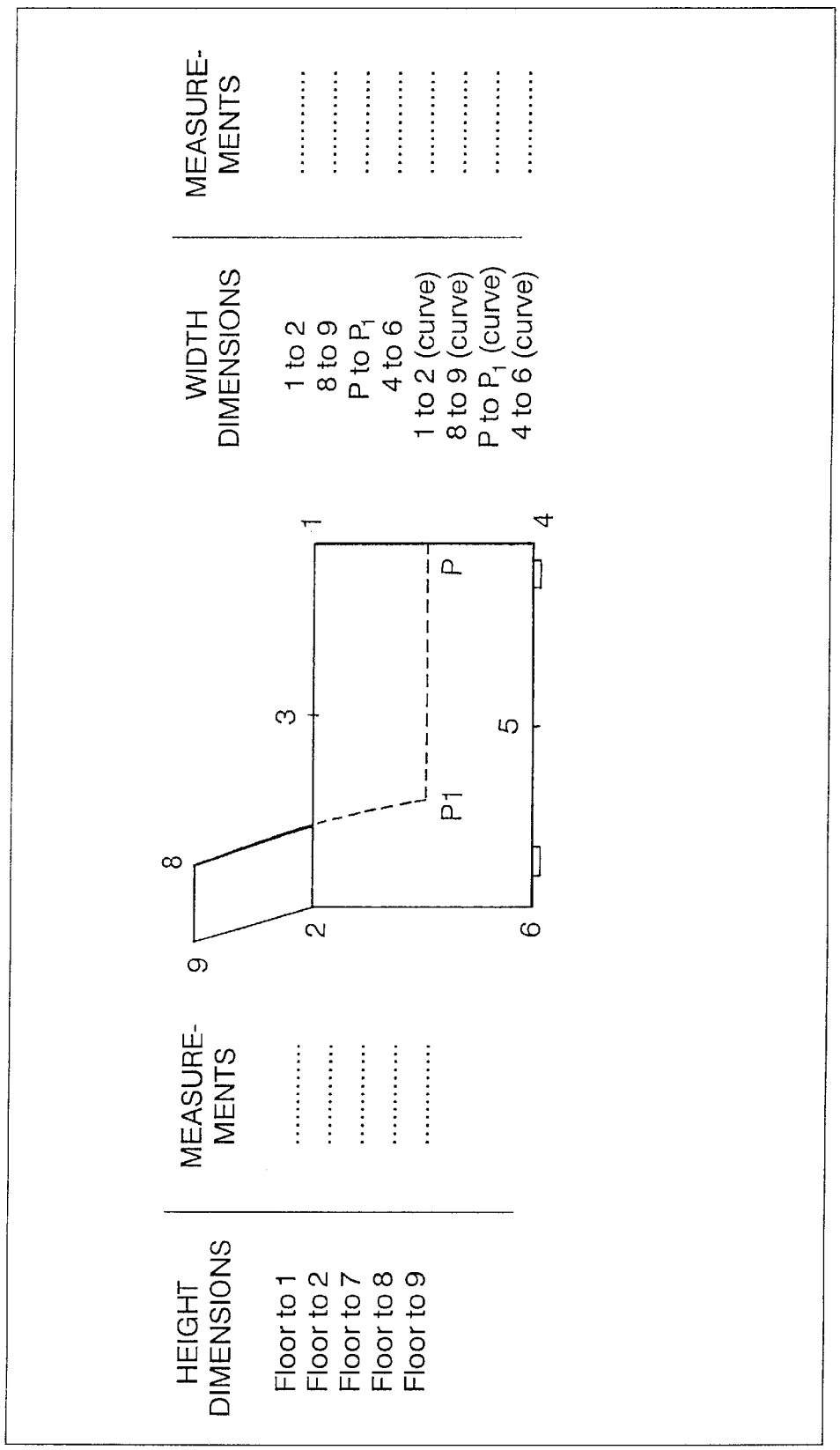

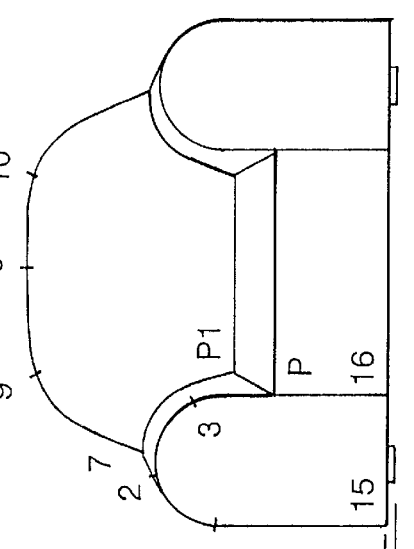
FRONT ELEVATION OF LOUNGE
Figure 2B(1)
*(Prior Art)*

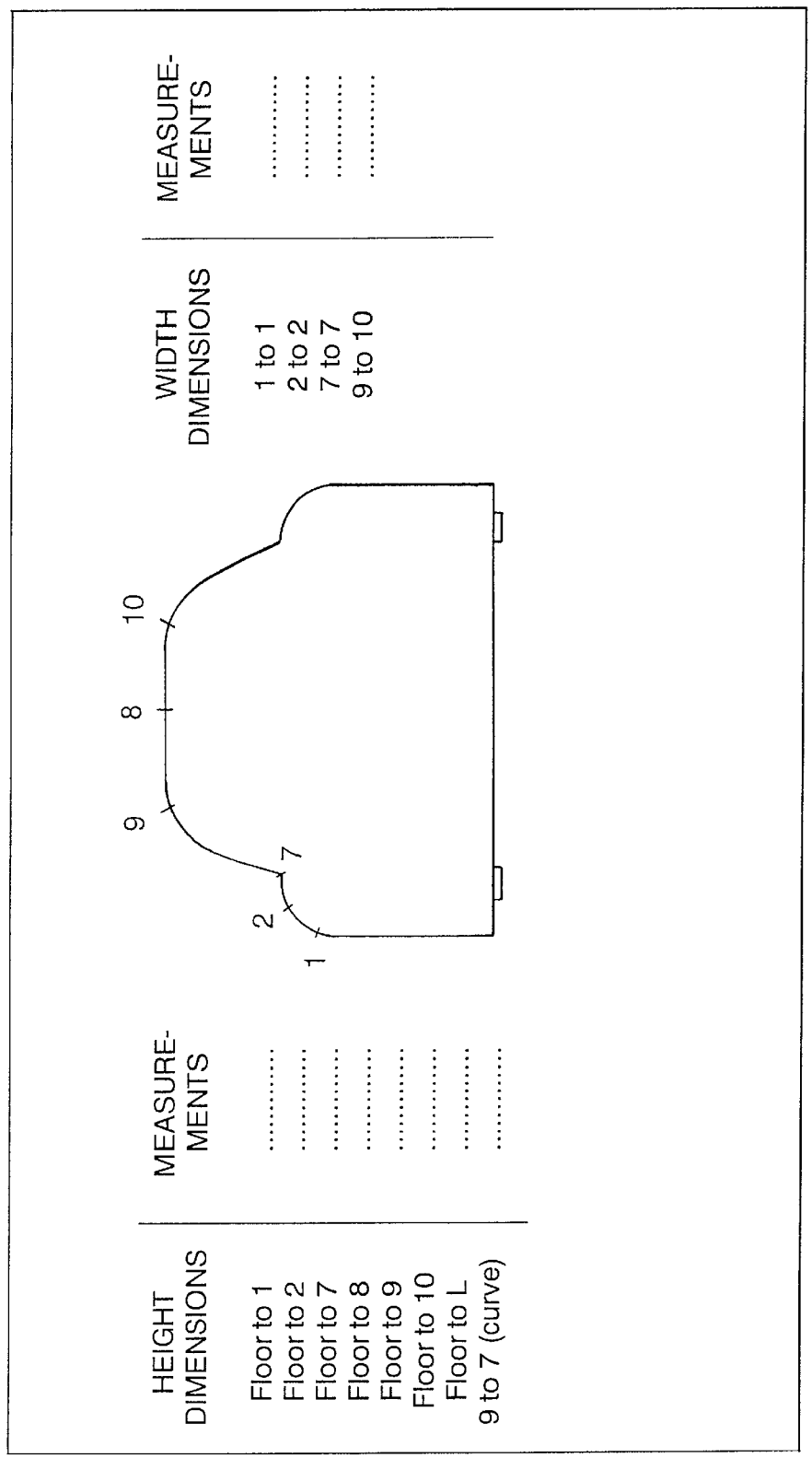
Figure 2B(2)
(Prior Art)

| WIDTH DIMENSIONS | MEASUREMENTS |
| --- | --- |
| 1 to 2 | ...... |
| U to U | ...... |
| P to P₁ | ...... |
| 4 to 6 (curve) | ...... |
| 7 to 2 (curve) | |
| 8 to 9 (curve) | ...... |
| P to P₁ (curve) | ...... |
| 4 to 6 | |

| HEIGHT DIMENSIONS | MEASUREMENTS |
| --- | --- |
| Floor to 1 | ...... |
| Floor to 2 | ...... |
| Floor to 3 | ...... |
| Floor to 5 | ...... |
| Floor to 1 (curve) | ...... |
| Floor to 2 (curve) | ...... |
| P to U (curve) | |
| P to U (curve) | ...... |
| P to U (curve) | ...... |

SIDE SECTION OF LOUNGE

Figure 2B(3)
*(Prior Art)*

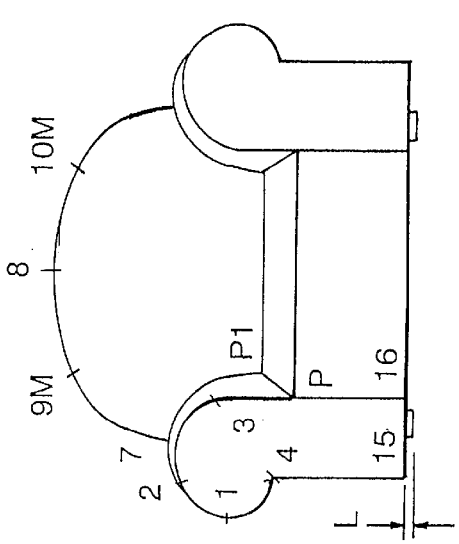
FRONT ELEVATION OF LOUNGE
Figure 2C(1)
*(Prior Art)*

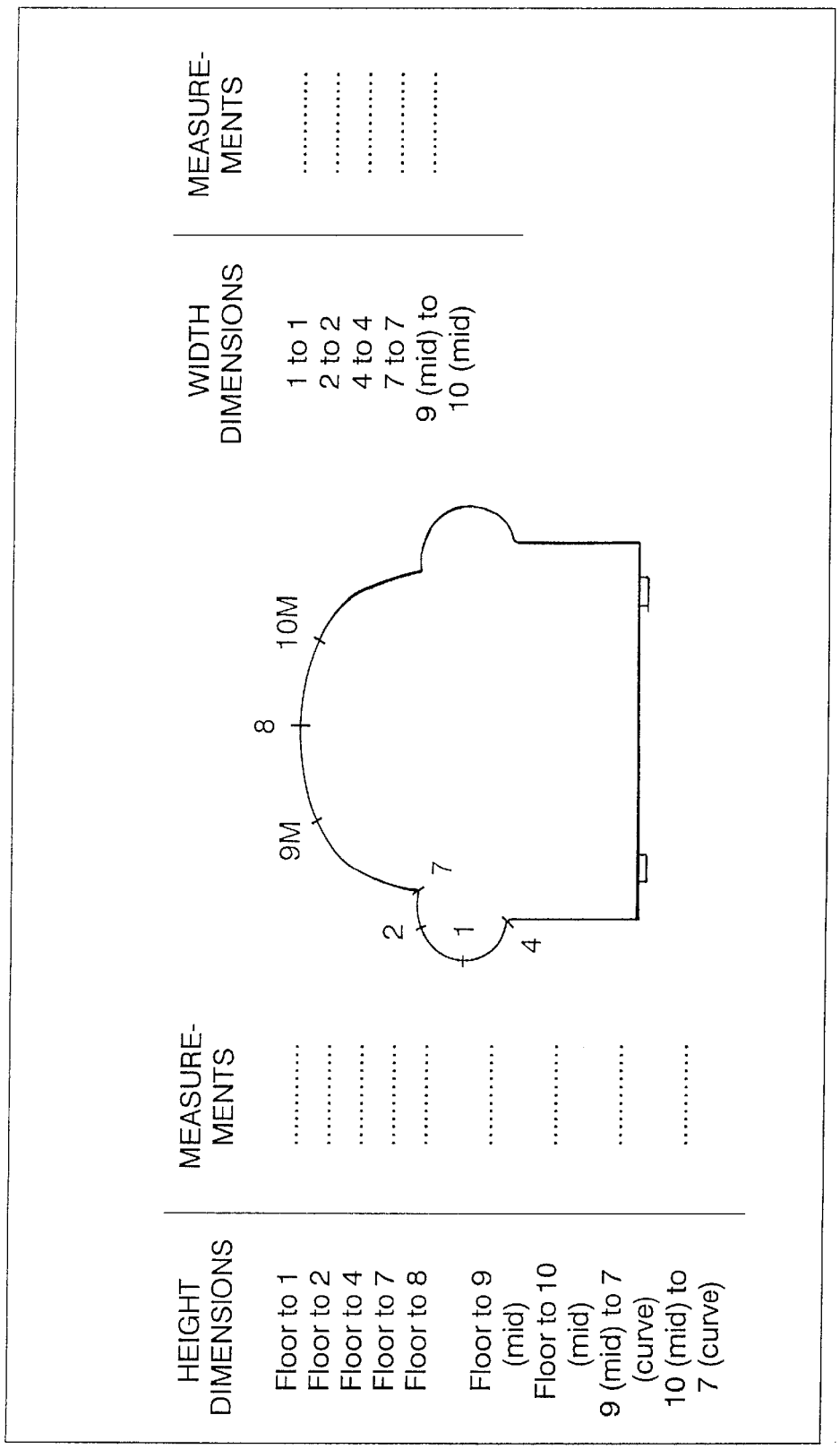
Figure 2C(2)
(Prior Art)

| HEIGHT DIMENSIONS | MEASURE-MENTS |
|---|---|
| Floor to 1 | ........ |
| Floor to 2 | ........ |
| Floor to 3 | ........ |
| Floor to 8 | ........ |
| Floor to 10 | ........ |
| Floor to 2U | ........ |
| Floor to 3U | ........ |
| Floor to U(*) | ........ |
| P to U (curve) | ........ |
| $P_2$ to U (curve) | ........ |
| $P_1$ to U (curve) | ........ |

| WIDTH DIMENSIONS | MEASURE-MENTS |
|---|---|
| 1 to 2 | ........ |
| U to U | ........ |
| P to $P_1$ | ........ |
| 4 to 6 (curve) | ........ |
| 7 to 2 (curve) | ........ |
| 8 to 9 (curve) | ........ |
| P to $P_1$ (curve) | ........ |
| 4 to 6 (curve) | ........ |

U = point where an outside arm meets inside arm, measurement is taken 'around arm' to meet at 90° to U.

SIDE SECTION OF LOUNGE
Figure 2C(3)
*(Prior Art)*

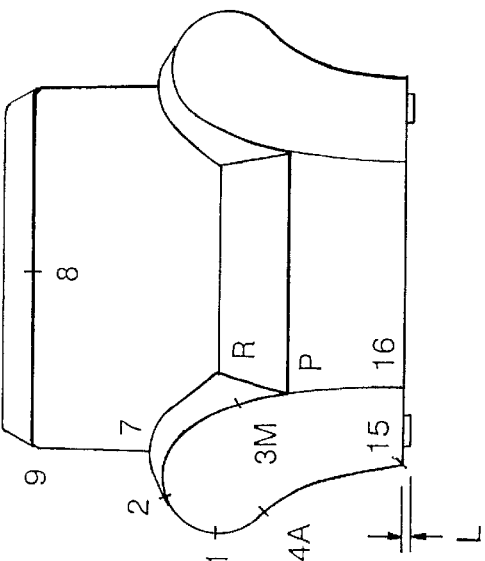
Figure 2D(1)
(Prior Art)

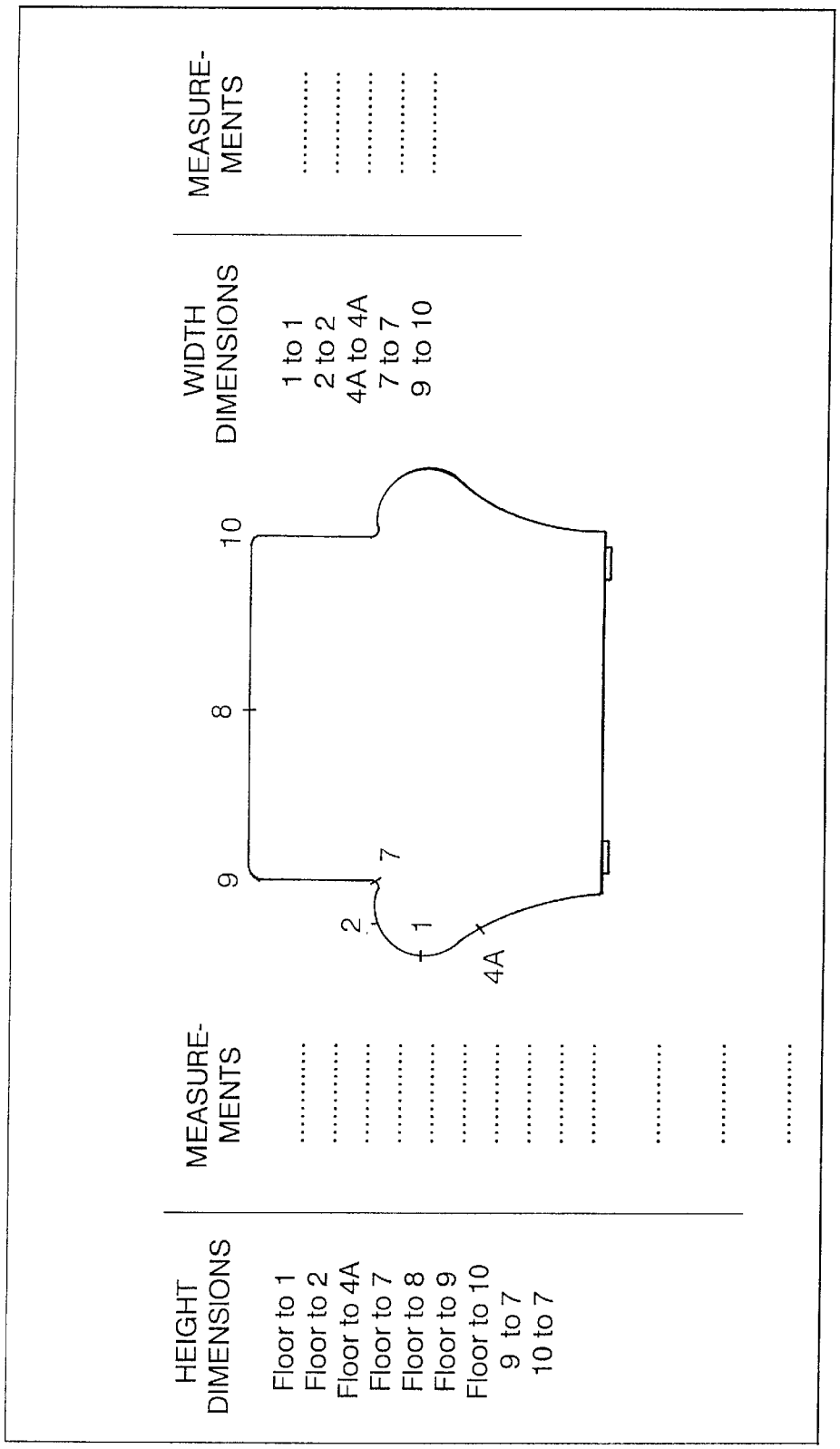
Figure 2D(2)
*(Prior Art)*
BACK ELEVATION OF LOUNGE

| HEIGHT DIMENSIONS | MEASURE-MENTS |
|---|---|
| Floor to 1 | |
| Floor to 2 | |
| Floor to 3 | |
| Floor to 8 | |
| Floor to 9 | |
| Floor to 1A | |
| Floor to 2A | |
| Floor to 3A | |
| P to A (curve) | |
| P₂ to A (curve) | |
| P₁ to A (curve) | |
| 9 to C | |
| 2 to C | |

| WIDTH DIMENSIONS | MEASURE-MENTS |
|---|---|
| 1 to 2 | |
| A to A | |
| P to P₁ | |
| 8 to 9 | |
| 4 to 6 | |

SIDE SECTION OF LOUNGE

Figure 2D(3)
*(Prior Art)*

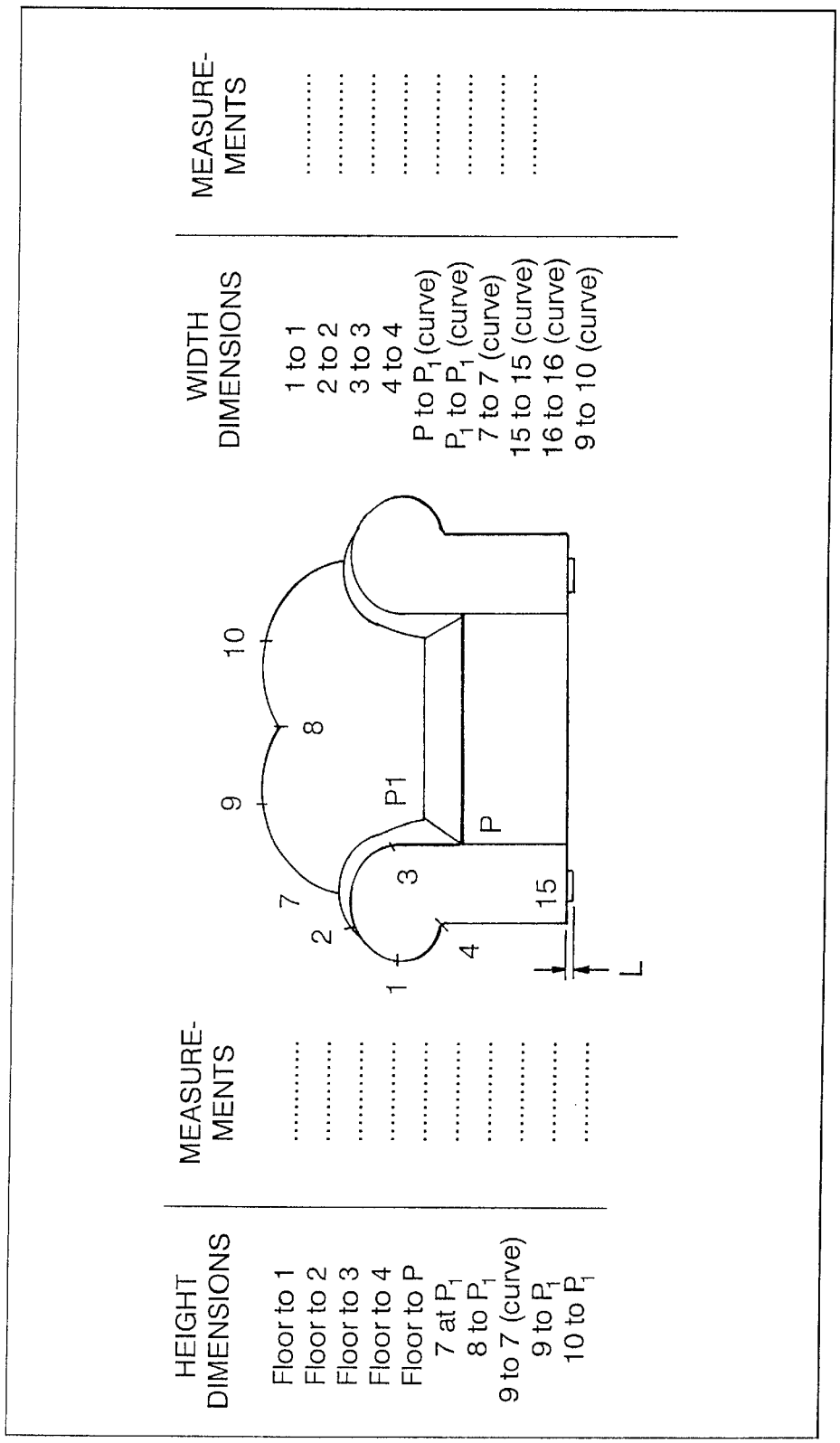
Figure 2E(1)
*(Prior Art)*

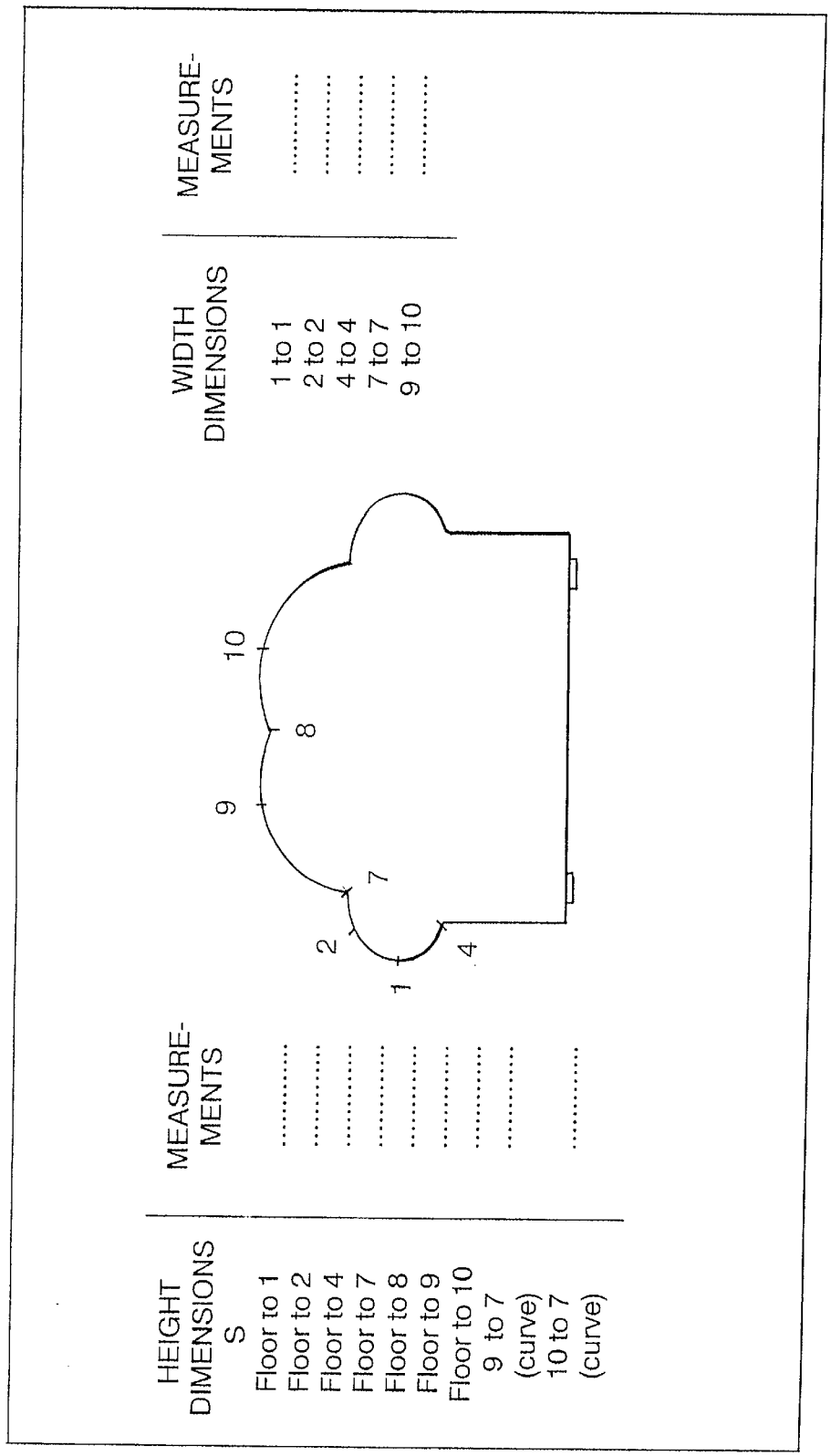
Figure 2E(2)
*(Prior Art)*

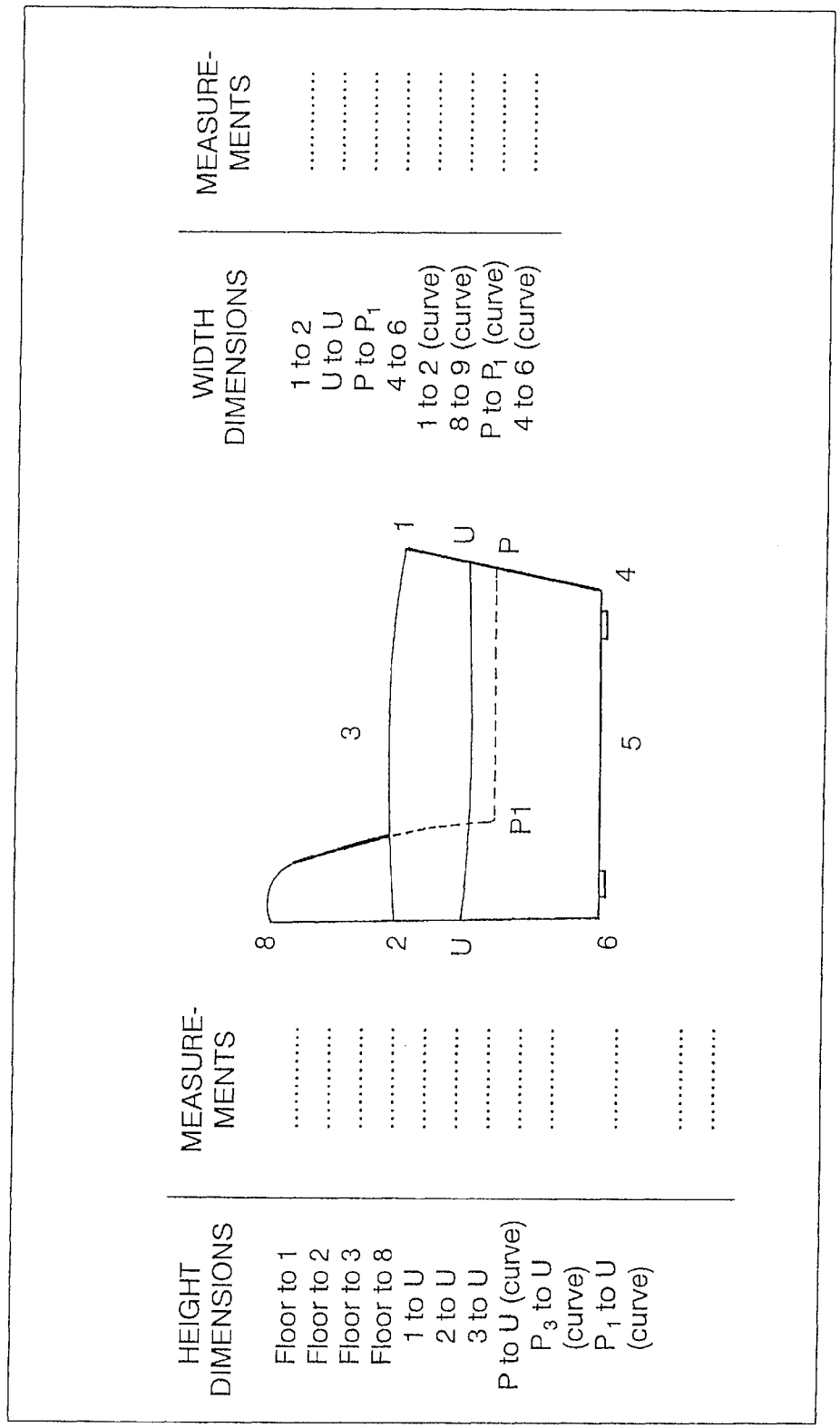
Figure 2E(3) (Prior Art)
SIDE SECTION OF LOUNGE

| HEIGHT DIMENSIONS | MEASUREMENTS |
|---|---|
| Floor to 1 | ......... |
| Floor to 2 | ......... |
| Floor to 3 | ......... |
| Floor to P | ......... |
| 7 at P₁ | ......... |
| 8 to P₁ | ......... |
| 9 to 7 (curve) | ......... |
| 9 to P₁ | ......... |
| 10 to P₁ | ......... |
| 11 to P₁ | ......... |
| 12 to P₁ | ......... |
| 10 to 7 (curve) | ......... |

| WIDTH DIMENSIONS | MEASUREMENTS |
|---|---|
| 1 to 1 | ......... |
| 2 to 2 | ......... |
| 3 to 3 | ......... |
| 4 to 4 | ......... |
| 5 to 5 | ......... |
| P to P₁ (curve) | ......... |
| P₁ to P₁ (curve) | ......... |
| 15 to 15 (curve) | ......... |
| 15(T) to 15(T) (curve) | ......... |

FRONT ELEVATION OF LOUNGE

Figure 2F(1)
*(Prior Art)*

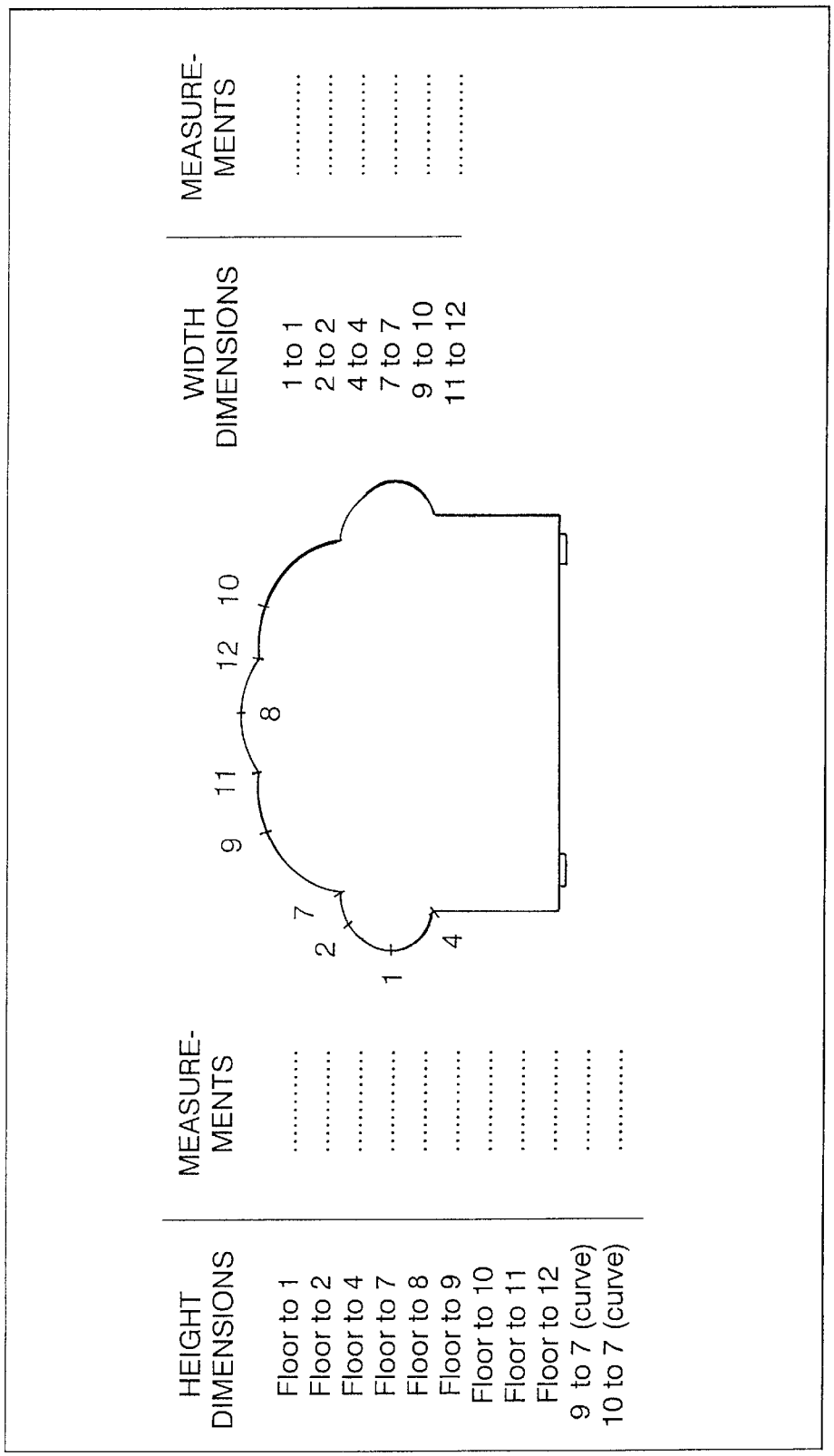

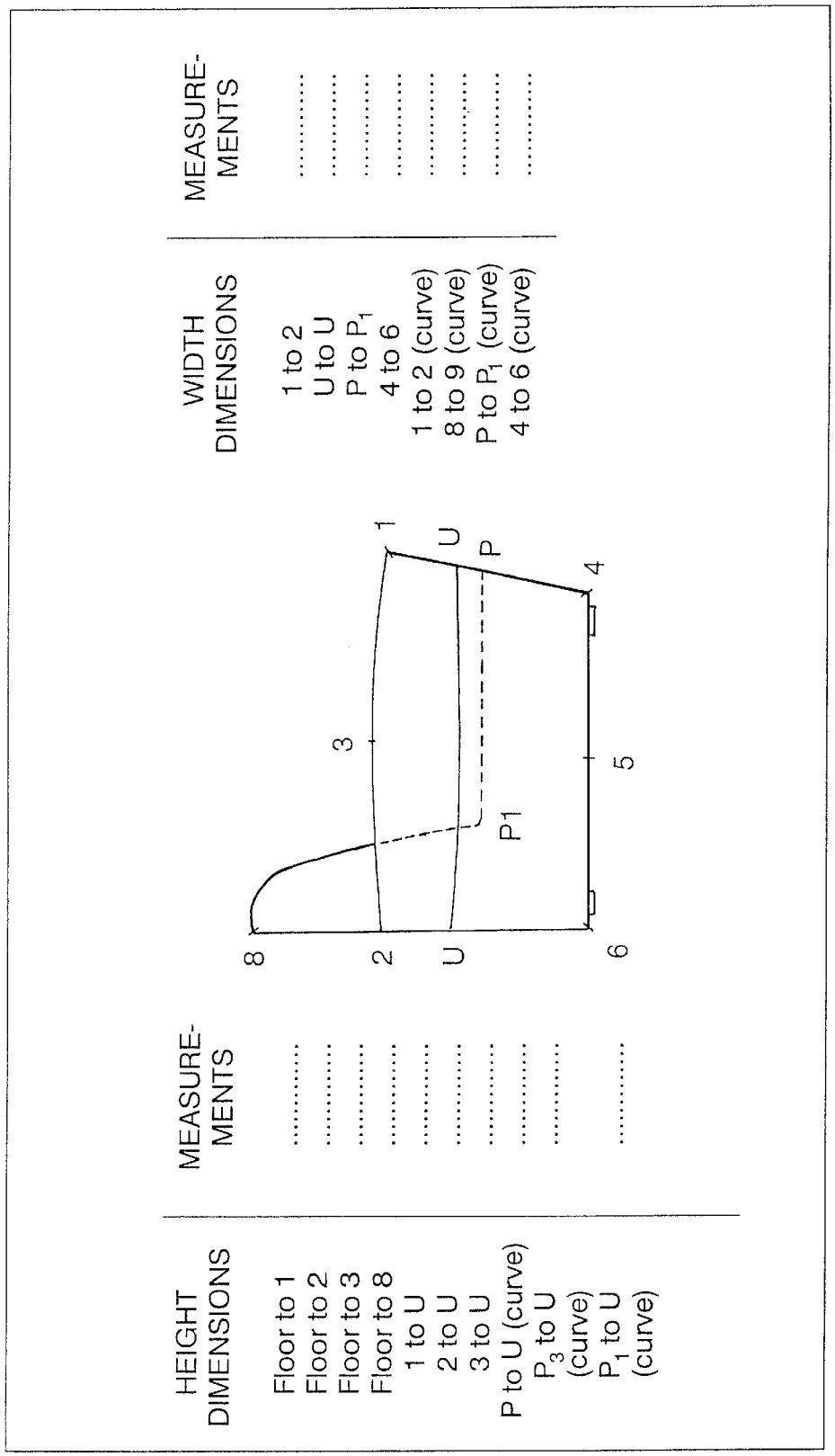

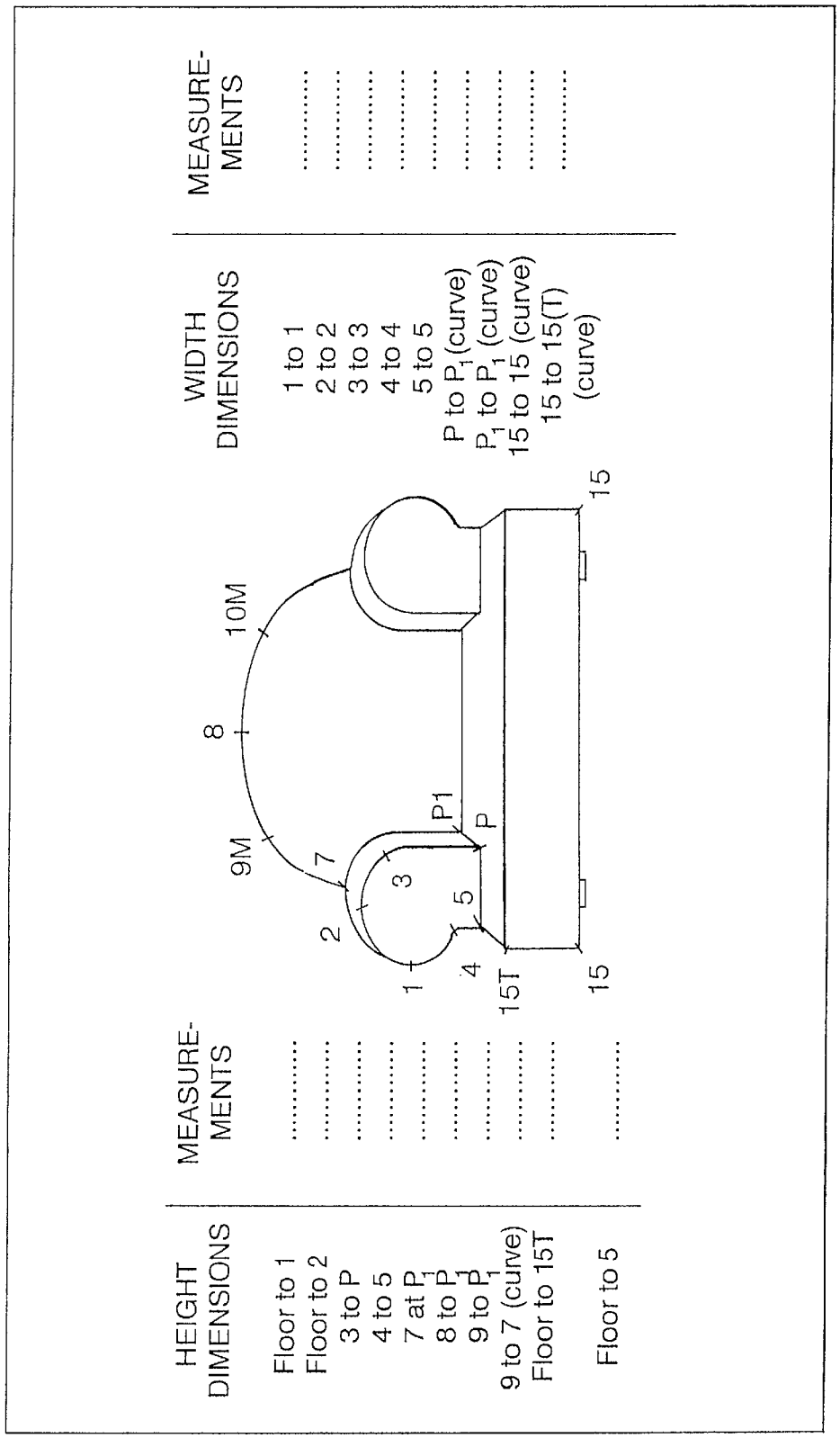

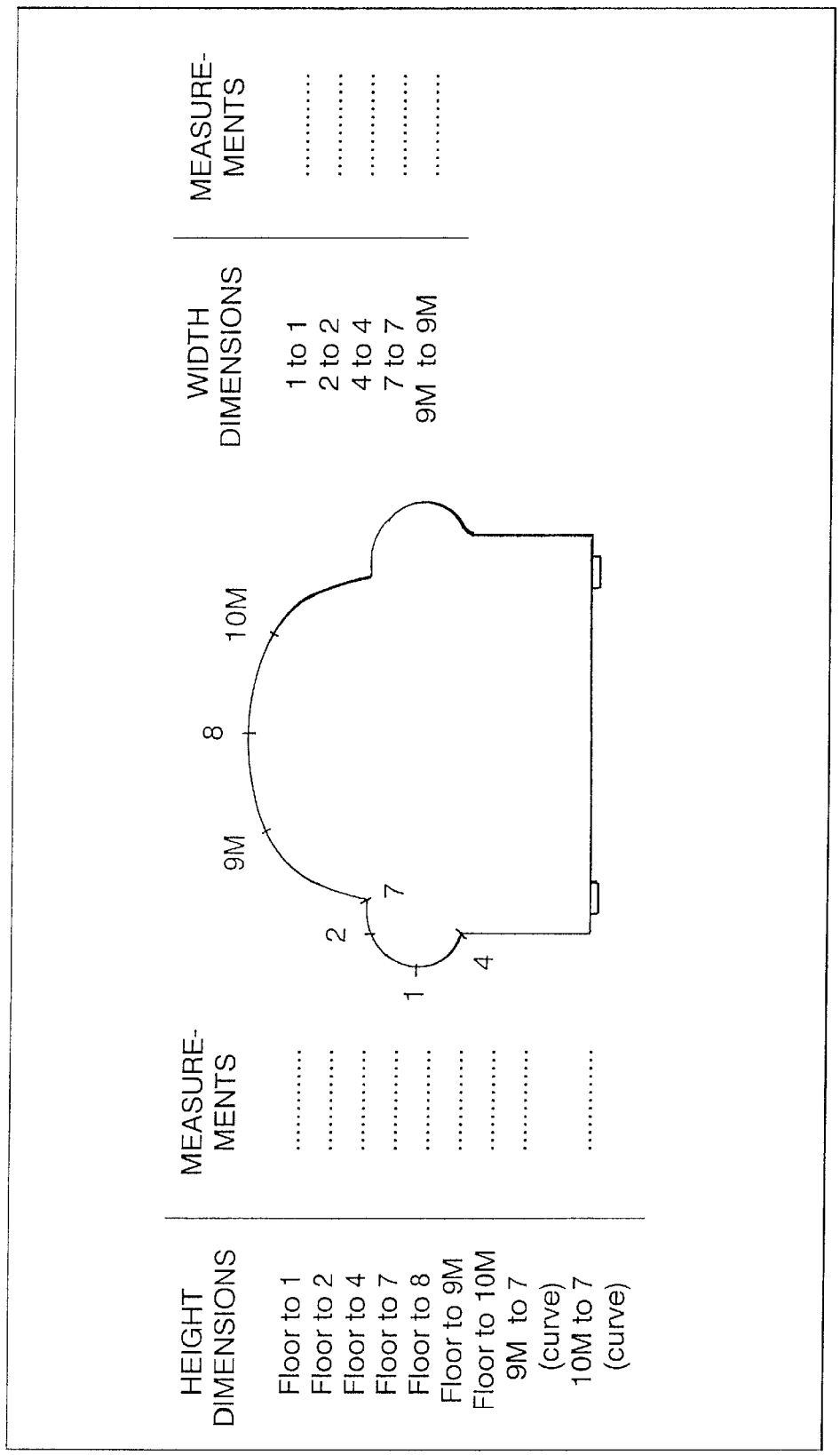
Figure 2G(2)
(Prior Art)

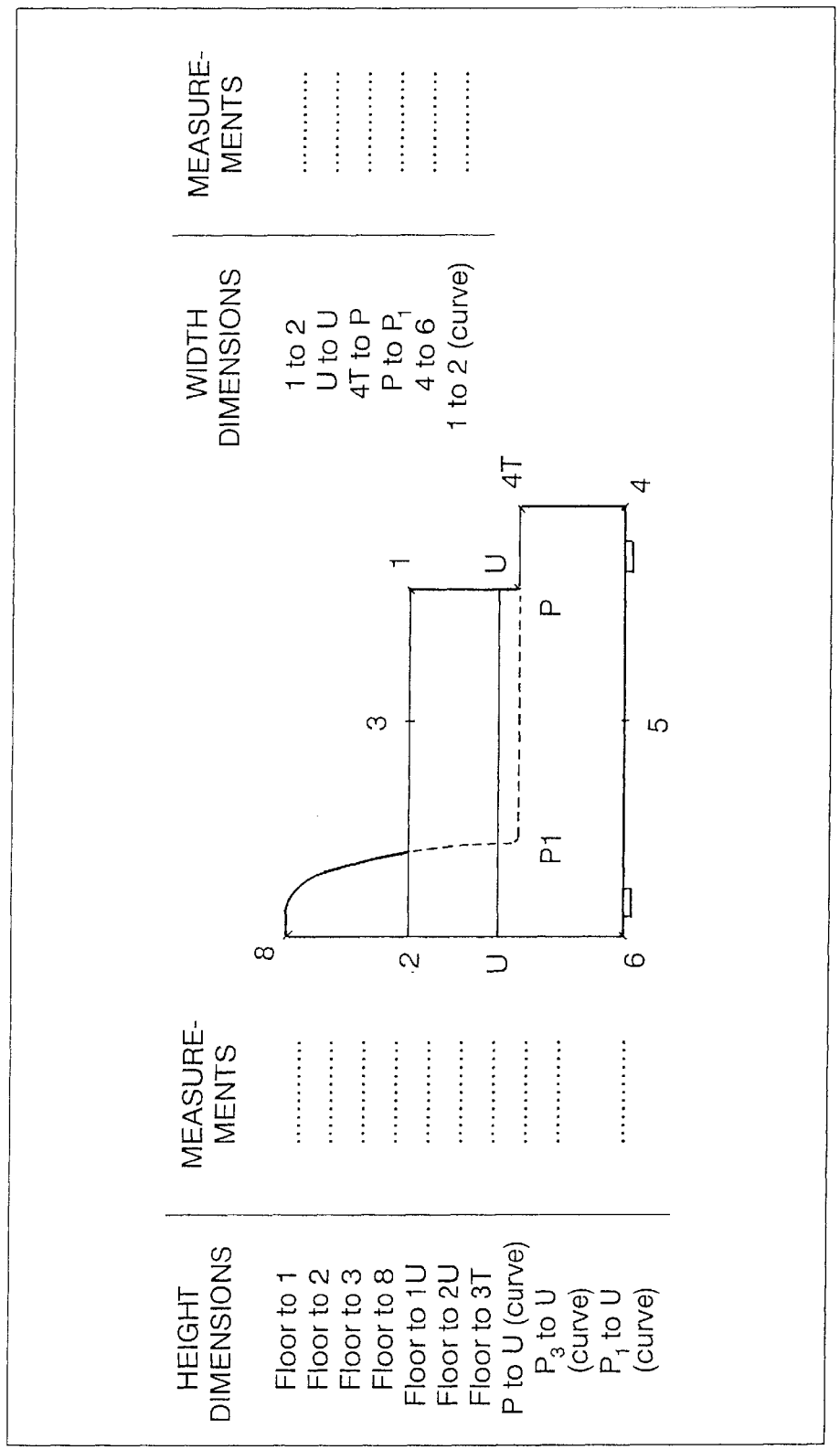
Figure 2G(3) (Prior Art)
SIDE SECTION OF LOUNGE

| | | TEMP 1 | TEMP 2 | TEMP 3 |
|---|---|---|---|---|
| Basic Club (BC) | 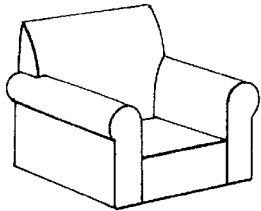 | SC | OA | IA |
| | | TEMP 1 | TEMP 2 | TEMP 3 |
| Short Arm Club (SAC) | 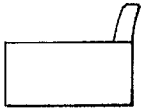 | (SAC)SC | (BC) OA | (BC) IA |
| | | TEMP 1 | TEMP 2 | TEMP 3 |
| Bow Fronted Club (BFC) |  | (SAC) SC | (BC) OA | (BC) IA |
| | | TEMP 1 | TEMP 2 | TEMP 3 |
| Lay-Back Arm Club (LBAC) | 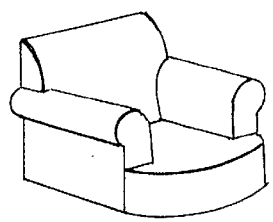 | (BC) SC | LAY BACK OA | LAY BACK IA |
Figure 2H(1)

| TEMP 4 | TEMP 5 | TEMP 6 | TEMP 7 | TEMP 8 | TEMP 9 |
|---|---|---|---|---|---|
| SK  | SE  | OB 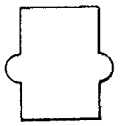 | IB  | CE  | |
| TEMP 4 | TEMP 5 | TEMP 6 | TEMP 7 | TEMP 8 | TEMP 9 |
| T SK 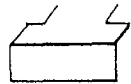 | T SE  | (BC) OB 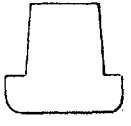 | (BC) IB | (BC) CE | (SIDE) ST  |
| TEMP 4 | TEMP 5 | TEMP 6 | TEMP 7 | TEMP 8 | TEMP 9 |
| T BOW SK  | T BOW SE | (BC) OB | (BC) IB | (BC) IB | |
| TEMP 4 | TEMP 5 | TEMP 6 | TEMP 7 | TEMP 8 | TEMP 9 |
| (BC) SK | (BC) SE | (BC) OB | (BC) IB | (BC) IB | |
Figure 2H(2)

CURVES TABLE

| # | SYMBOL | CURVE | START | FINISH | COMMENTS | FORMULA |
|---|--------|-------|-------|--------|----------|---------|
| 1 | LH | Straight Line | - | - | Not Vertical | $y = b*x + c$ |
| 2 | LV | Straight Line | - | - | Not horizontal | $x = b*y + c$ |
| 3 | AA | Arc | Angle | Angle | 3 inputs needed | $y = a*x^2 + b*x + c$ |
| 4 | VA | Arc | Vertical | Angle | - | $x = a*y^2 + b*y + c$ |
| 5 | HA | Arc | Horizontal | Angle | - | $y = a*x^2 + b*x + c$ |
| 6 | AV | Arc | Angle | Vertical | - | $x = a*y^2 + b*y + c$ |
| 7 | AH | Arc | Angle | Horizontal | - | $y = a*x^2 + b*x + c$ |
| 8 | VA | Arc | Vertical | Angle | Finds Position | $x = a*y^2 + b*y + c$ |
| 9 | TR | Elipse | Vertical | Horizontal | Top right 1/4 | $y^2/a^2 + x^2/b^2 = 1$ |
| 11 | TL | Elipse | Horizontal | Vertical | Top left 1/4 | $y^2/a^2 + x^2/b^2 = 1$ |
| 13 | HH | S-Curve | Horizontal | Horizontal | Cubic | $y = a*x^3 + b*x^2 + c*x +$ |
| 14 | VV | S-Curve | Vertical | Vertical | Cubic | $x = a*y^3 + b*y^2 + c*y +$ |
| 15 | BR | Elipse | Vertical | Horizontal | Bottom right 1/4 | $y^2/a^2 + x^2/b^2 = 1$ |
| 16 | AV | Arc | Angle | Vertical | Finds Position | $x = a*y^2 + b*y + c$ |
| 17 | BL | Elipse | Horizontal | Vertical | Bottom left 1/4 | $y^2/a^2 + x^2/b^2 = 1$ |
| 24 | RV | Round corner | Last curve | Next curve | Rounds V corner | |
| 25 | RH | Round corner | Last curve | Next curve | Rounds H corner | |

Figure 4(A)

| Series of Codes | Input Standard Triad | Input Triad + | Output Function | Output Arc Length | Output Arc Length+ | Special |
|---|---|---|---|---|---|---|
| 000's | Yes | - | - | - | - | - |
| 100's | - | Yes | Yes | - | - | - |
| 200's | - | Yes | Yes | Yes | - | - |
| 300's | Yes | - | - | Yes | - | - |
| 400's | - | Yes | - | - | - | Note A |
| 500's | - | Yes | - | - | Yes | - |
| 600's | - | Yes | - | - | - | Note B |

SERIES TABLE

Figure 4(B)

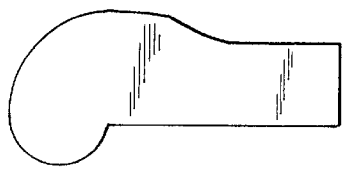
Figure 5A(1)
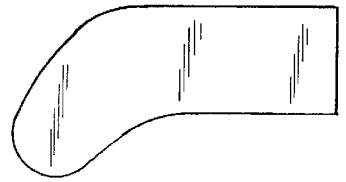
Figure 5A(2)
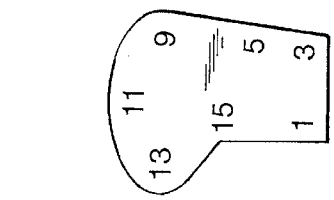
Figure 5A(3)
Figure 5A(4)
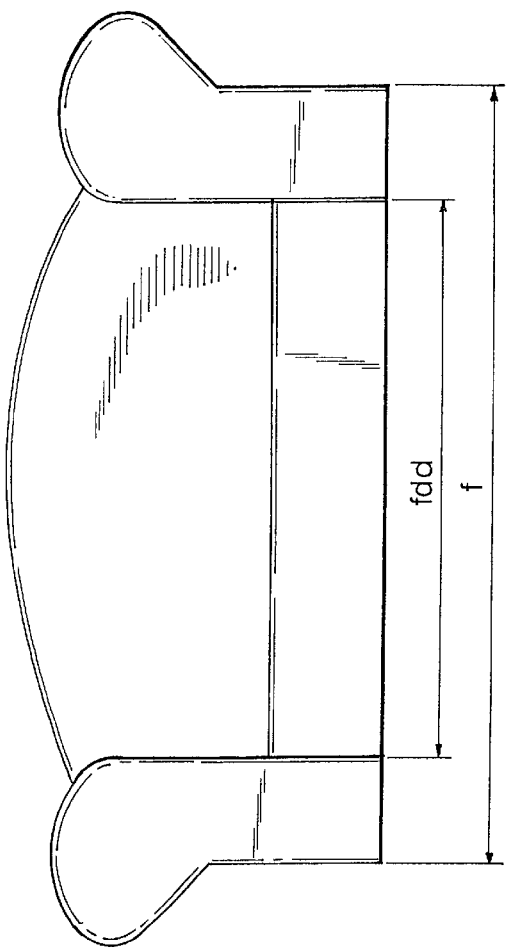
Figure 5B

COVERS DATABASE

IMPORTANT
- Please complete all measures in imperial (inches).
- Please ensure all measures are clearly marked in the correct box.
  i.e.: -A on the chair represents A in the relevant box.
- Please measure form dot-to-dot along each line.
- Please measure the height of your castors.
- Please indicate depth of crevices where shown.
- Please complete all pages 1-4.
- Please double check ALL BOXES HAVE A MEASUREMENT INSIDE.

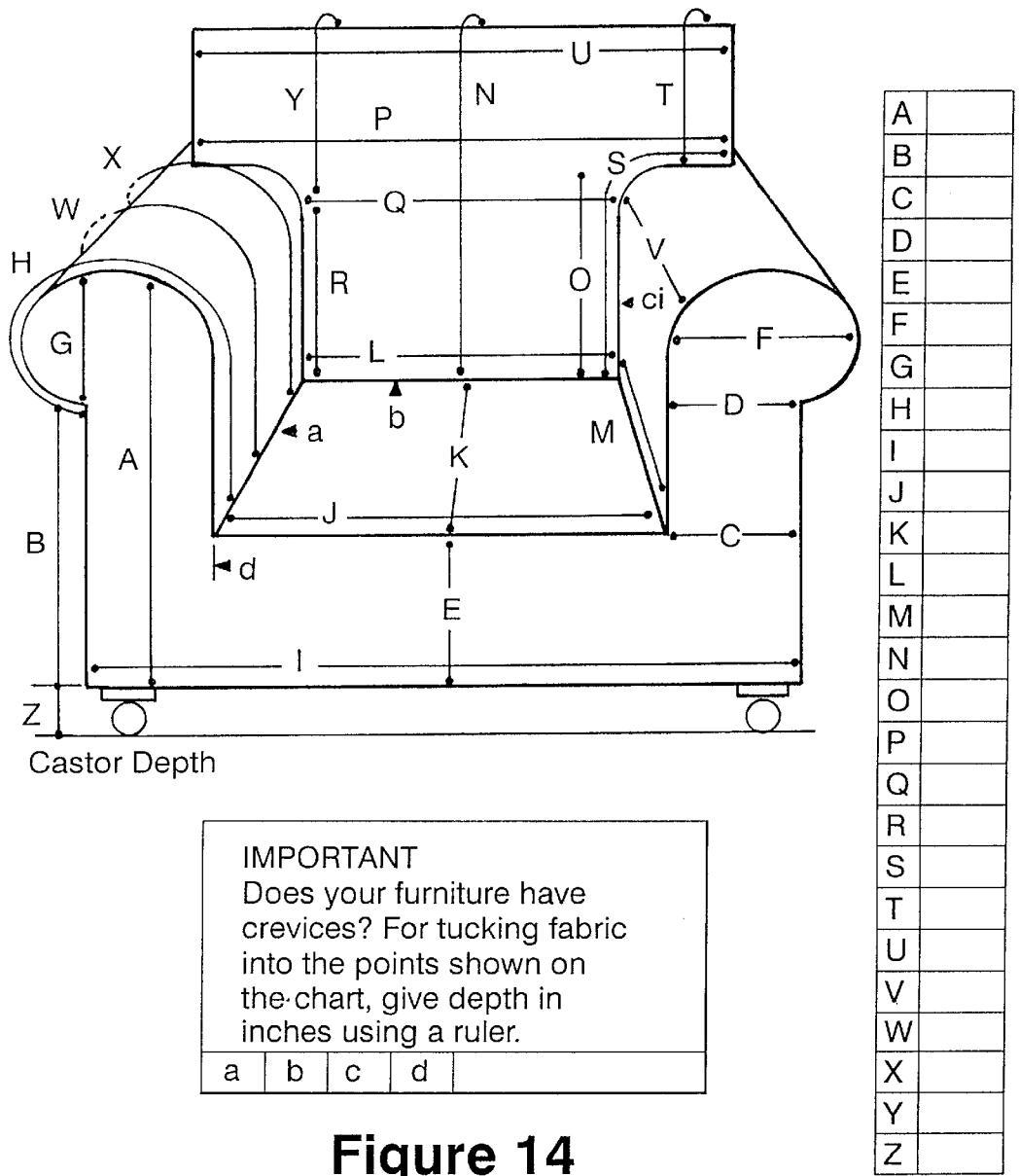

Castor Depth

IMPORTANT
Does your furniture have crevices? For tucking fabric into the points shown on the chart, give depth in inches using a ruler.

| a | b | c | d |
|---|---|---|---|
|   |   |   |   |

Figure 14
*(Prior Art)*

| | | | |
|---|---|---|---|
| 1. | (SL) | Straight line (not vertical) — | $y = ax + b$ |
| 2. | (SV) | Straight line (vertical) | | $x = ay + b$ |
| 3. | (AA) | Quadratic with no-critical points | $y = x^2 + bx + c$ |
| 4. | (VA) | Quadratic starting vertically | $x = ay^2 + by + c$ |
| 5. | (HA) | Quadratic starting horizontally | $y = ax^2 + bx + c$ |
| 6. | (AV) | Quadratic ending vertically | $x = ay^2 + by + c$ |
| 7. | (AH) | Quadratic ending horizontally | $y = ax^2 + bx + c$ |
| 9. | (Vh) | Ellipse top right quadrant | $y = b \times \sqrt{(1-x^2/a^2)}$ |
| 10. | (Rv) | Ellipse top left quadrant | $y = a \times \sqrt{(1-y^2/b^2)}$ |
| 11. | (vH) | Ellipse bottom left quadrant | $y = -b \times \sqrt{(1-x^2/a^2)}$ |
| 12. | (VH) | Ellipse bottom right quadrant | $x = -a \times \sqrt{(1-y^2/b^2)}$ |
| 13. | (HH) | Cubic starting and finishing horizontally | $y = ax^3 + bx^2 + cx + d$ |
| 14. | (VV) | Cubic starting and finishing vertically | $x = ay^3 + by^2 + cy + d$ |

Figure 17

Special Points Calculations are needed
 if checks needed against input arc length
 if photographs used
 if depending on other template measurements

REMOTE MANUFACTURE OF FURNITURE COVERS

MICROFICHE APPENDIX

This application is submitted with a computer-readable diskette of the text of Appendix A in Microsoft Word 7.0, which, when printed, includes thirty sheets. Appendix A is a program listing of the preferred embodiment of the present invention.

FIELD OF THE INVENTION

The present invention relates to the manufacture of covers for articles of uniform and non-uniform shape, for example furniture, and the described embodiment discloses a method of manufacturing covers for lounges, chairs, sofa beds and the like.

BACKGROUND OF THE INVENTION

It is often desired to re-cover items of upholstered furniture to improve their appearance.

It is known to provide ready-made loose covers which are manufactured to a single style of lounge, for example. When such covers are fitted to a lounge of slightly varying style, an inappropriate fit is obtained which is not preferred. Because of the range of furniture styles currently available, and because such styles may not coincide with styles of times past, it is not economic to manufacture a satisfactory range of covers to suit public demand.

Alternatively, an upholsterer may custom design and individually manufacture a fitted cover for each item of furniture, which usually requires that the item of furniture be taken away to the upholsterer's premises. This is particularly true if the item of furniture has an unusual or distinctive style. A suitable pattern can be manually developed and a cover made and fitted accordingly. Importantly, the upholsterer often requires the item of furniture because such items include subtle and complex curves which require an exacting fit. Further, individual parts of a single cover often need to display a three-dimensional form which necessitates much trial and error in the fitting of the cover. However, this procedure can cause inconvenience to the owner of the furniture, who has to do without the item of furniture until such time as the cover has been finished and the item returned.

Some manufacturers have "measurement forms" of which FIG. 14 is a sample. These manufacturers have staff specially trained to design the templates from these forms and the skills needed can only be gained by experience, usually over a period of 12 months or more. Further, this skill is in the form of an art rather than a science and during this period of development, the productivity of staff involved is minimal. Even then, using this prior art technique experienced staff can take up to an 1 hour to design some templates. FIGS. 2A to 2G are other measuring forms used by other manufacturers and illustrate the diversity of styles of sofas.

It is therefore desirable to provide a means by which custom-fitted covers can be made without the need for the upholsterer to remove the item of furniture during the manufacture process. It is also desirable that each custom-fitted cover be made with a minimum of tolerance so as to provide a tight "fitted" appearance. It is also desirable to improve the efficiency in which custom fitted covers can be manufactured.

There is also a need for manufacture of covers for articles of uniform and non-uniform shape for substantially all types of cover related and skin related applications and processes. The process described herein may be applied to articles and processes requiring a covering or skin. Typical applications include, for example: car covers, sculpture covers, mold manufacturing processes, construction applications, house covers, tents, boat covers, upholstery, sheet metal ducting, table covers, luggage, suit cases, umbrella manufacturing, wall coverings, wall paper, and protective covers of all types. The covering or skin may be of fabric, sheet metal, rubber, thermoplastics, thermosetting polymers, fiberglass, or other suitable materials.

There is also a need for a process that allows an unskilled worker to produce a cover for a three dimensional article by producing a plurality of portions of the cover or a plurality of templates that may be adjoined or abutted one to the other to form the cover.

SUMMARY OF THE INVENTION

In accordance with one aspect of the present invention, there is provided a method of manufacturing a cover for an article, which method includes the steps of:

a) ascertaining dimensional data of the article, and relating this data to individual portions of the article, b) determining a group of physically inter-related templates which are associated with these individual portions, wherein each template is definable on a plane of co-ordinates and is derived from a series of mathematical functions evaluated using this data, and c) using each template to form a corresponding cover piece and joining the cover pieces to form the cover.

Preferably, at least one of the portions is three-dimensional.

Preferably, one of the templates associated with the three-dimensional portion includes information about pleats.

Preferably, these templates also include information about tuck-aways, which tuck under or back of seat of the sofa, and turn-unders which are tied under the seat.

Preferably, this information also includes data about sofa cushions, valances, (which appear like a skirt below the seat) and allowance for the extension of stretch material.

Preferably, the templates can optionally be connected together and constructed as composite templates and can include information to enable the physical interrelationship to be sew fastened.

Optionally the information includes information about seams and positioning tabs.

In accordance with another aspect of the present invention, there is provided a method of producing a set of templates being represented on at least one medium and for producing a cover for furniture, including the steps of:

a) transferring physical dimensional data of the furniture to a set of co-ordinate point arrangements, each point of which are interconnected by a graphical representation of a mathematical function;

b) supplementing each arrangement with a tolerance value; and c) transferring each said arrangement to the medium.

Preferably, these templates are computationally determined and printed onto a medium used to define at least one portion of the cover, with each portion being produced using the template.

Preferably, these templates are computationally determined and directly transferred to a means for producing at least one portion of the cover.

Also optionally, these templates include a computer readable representation of this portion and the means for producing includes an automated cutting machine configurable to cut these portions.

In accordance with another aspect of the present invention, there is provided a computer readable medium comprising a series of instructions operable by a computer to implement a method as recited above.

Preferably, this computer readable medium is selected from one of a magnetic disk, an optical disk or a computer network.

In accordance with another aspect of the present invention, there is provided a system of manufacturing a cover for an article this system includes a) a means for receiving a series of dimensions corresponding to one or more predetermined parameters of the article;

b) a means for computing one or more configurations which can be joined to form a cover for the article, and c) a means for producing one or more templates, corresponding to these one or more configurations, respectively.

In accordance with another aspect of the present invention, there is provided a system for producing instructional diagrams with a personal computer. This system includes an input means for receiving and arranging data related to an article into arrays; a processing means for reading these arrays and for tabulating the data according to a pre-determined arrangement, including information about co-ordinate points and mathematical functions provided there between; and an output means for transferring a representation of this information into an instructional diagram.

The present invention may be implemented, using a computer or a network of computers, such as, for example, a Local Area Network (LAN), Wide Area Network (WAN), or global network, such as the Internet. For example, the present invention relates to the manufacture of covers for articles of furniture and discloses a method of manufacturing covers for chairs sofas and the like. When covers are fitted to a sofa of slightly varying style to a known sofa, an inappropriate fit is obtained which is not preferred. Because of the range of furniture styles available and because such styles may coincide with styles of times past, it is not economic to manufacture a satisfactory range of covers to suit public demand. Alternatively, an upholsterer may custom design an individual manufacture a fitted cover for each item of furniture which usually requires that the item be taken to the upholsterer's premises. The present invention discloses a method of manufacturing a custom fitted cover without the need for the upholsterer to remove the item of furniture during the manufacturing process. It also enables the cover to be made with a minimum of tolerance and a tight-fitted appearance.

The present invention incorporates a process that allows an unskilled worker to produce a cover for a three dimensional article by producing a plurality of portions of the cover or a plurality of templates that may be adjoined or abutted one to the other to form the cover. The process as applied to upholstery is described below:

Upholsterers, interior decorators and householders ("interested parties") will be invited over the Internet to advise the type of sofa, settee, or other furniture which they wish to cover. This will be done by showing the various styles of furniture and/or the manufacturers. Sub-menus will then display photographs and/or line drawings of the furniture chosen. In response to the interested parties, Front, Back and Profile forms as attached will be displayed illustrating the dimensions of the furniture to be covered. These forms which include help features explaining each of the dimensions needed, enable the interested party to respond with the relevant dimensions. Cross-checks of these dimensions will be made interactively advising the interested party where errors occur. The interested party can print the forms and use these to record measurements or if they prefer key in the details directly to the Internet.

Further sub-menus allow the interested party to choose from various options including stitching instructions, the presence of valances, cushions, tuckaways, turnunders and the joining of templates. At this stage the type of material such as cotton or stretch will be requested allowing adjustments to measurements where appropriate, and then patterns can be displayed allowing choices to be considered or made. Interior design options of curtains, carpets, etc., to complement the patterns chosen for the covers will also be offered. The interested party will then be asked to advise if they would like the templates necessary to produce this cover to be mailed to them so that they can sew their own cover or if they would like them to be produced by an upholsterer.

Prices for manufacturing and delivering the cover or template are communicated to the interested party. Payment details by credit card or other means are then requested from the interested party. An order form is then provided to the interested party to place the order online through the Internet.

A tiered structure allows upholsterers, fabric suppliers and converters to advertise over the Internet. This structure enables priority advertisements to be displayed more prominently than lower priority advertisements. The Internet system also allows connection of this system directly with the more prominent advertisements placed by particular upholsterers.

All the inquiries including names and addresses, styles of furniture and dimensions are archived. Periodical analyses are made of this archive. Fuzzy logic and other methods are used to recognize and group together orders which appear to require covers for the same model of furniture. As sufficient orders of a model are collected, it is be possible to determine correct measurements. This further helps the interested parties by advising default dimensions when these are input. It also provides the basis for long-term marketing, for example, a mail shot five years after purchase asking if replacement is needed for the five year old cover. Such replacement can be delivered at a reduced price as all the measurements and templates have been retained from the date of the original order.

BRIEF DESCRIPTION OF THE DRAWINGS

A preferred embodiment of the present invention will now be described with reference to the drawings, in which:

FIGS. 2A(1) through 2H(2) show parts of sample measurement forms which are required to be taken from a particular sofa as shown;

FIG. 4A is a table of curve codes used in conjunction with the main computer procedure of FIG. 3;

FIG. 4B is a series table used in conjunction with the main computer procedure of FIG. 3;

FIGS. 5A(1) through 5A(4) are a series of examples of scroll templates where each example is a portion of the sofa which corresponds to a template to be produced in accordance with an embodiment of the present invention;

FIG. 5B is an example of a front elevational diagram showing relevant dimensions of the sofa, associated with the discussion of FIG. 5A herein regarding the template designated as "(i)" in FIG. 5A(1);

FIG. 14 is a sample pro forma document that has been used in the prior art to record measurements of a sofa;

FIG. 17 is a set of mathematical functions in accordance with the alternative embodiment of FIGS. 15 and 16;

Figure 1:
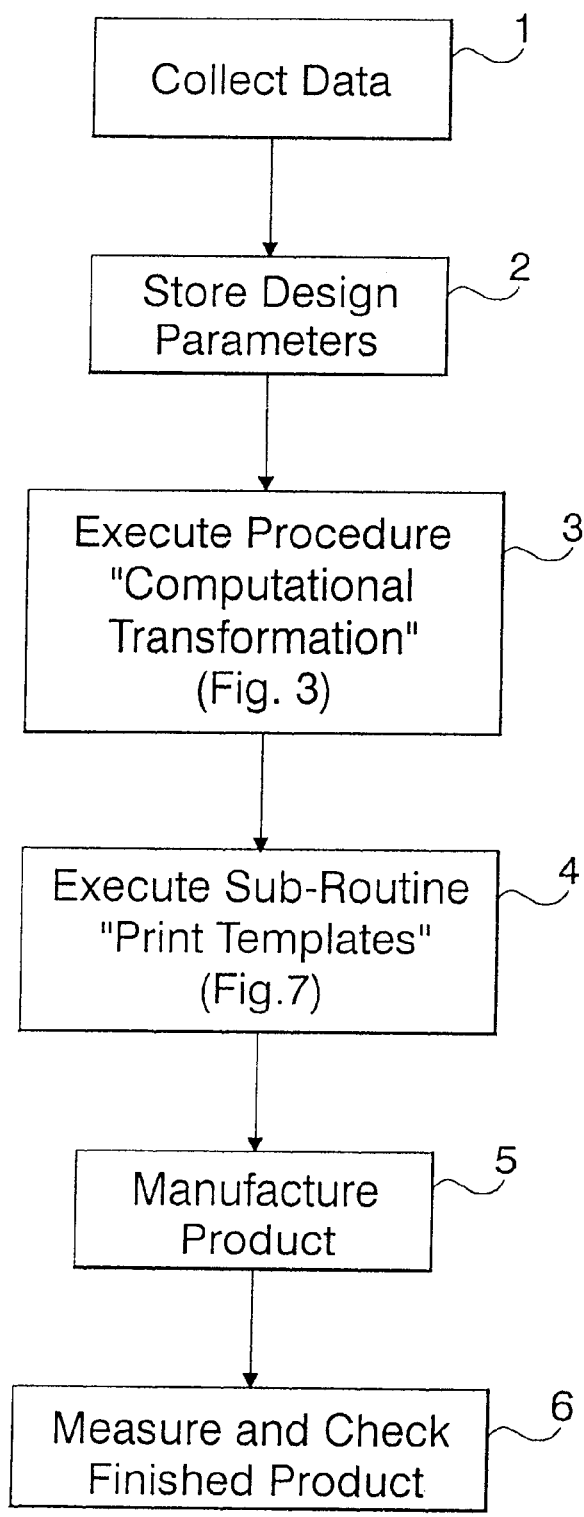
FIG. 1 is a flow chart for explaining a broad overview of the process of the preferred embodiment.

Appendix A, which is submitted separately on a computer readable diskette in Microsoft Word 7.0, pursuant to 37CFR 1.96(C)(2), is a program listing of the preferred embodiment.

DETAILED DESCRIPTION

FIGS. 1–24 show a process for manufacturing a cover for an article. The cover may be used for articles of uniform and non-uniform shape for substantially all types of cover related and skin related applications and processes. The process described herein may be applied to articles and processes requiring a covering or skin.

Typical applications include, for example: car covers, sculpture covers, mold manufacturing processes, construction applications, house covers, tents, boat covers, upholstery, sheet metal ducting, table covers, luggage, suit cases, umbrella manufacturing, wall coverings, wall paper, and protective covers of all types. The covering or skin may be of fabric, sheet metal, rubber, thermoplastics, thermosetting polymers, fiberglass, or other suitable materials.

In accordance with one aspect of the present invention, there is provided a method of manufacturing a cover for an article, which method includes the steps of:

a) ascertaining dimensional data of the article, and relating this data to individual portions of the article, b) determining a group of physically inter-related templates which are associated with these individual portions, wherein each template is definable on a plane of co-ordinates and is derived from a series of mathematical functions evaluated using this data, and c) using each template to form a corresponding cover piece and joining the cover pieces to form the cover.

Preferably, at least one of the portions is three-dimensional.

Preferably, one of the templates associated with the three-dimensional portion includes information about pleats.

Preferably, these templates also include information about tuck-aways, which tuck under or back of a seat of the sofa, and turn-unders which are tied under the seat.

Preferably, this information also includes data about sofa cushions, valances, (which appear like a skirt below the seat) and allowance for the extension of stretch material.

Preferably, the templates can optionally be connected together and constructed as composite templates and can include information to enable the physical interrelationship to be sew fastened.

Optionally the information includes information about seams and positioning tabs.

In accordance with another aspect of the present invention, there is provided a method of producing a set of templates being represented on at least one medium and for producing a cover for furniture including the steps of:

a) transferring physical dimensional data of the furniture to a set of co-ordinate point arrangements, each point of which are interconnected by a graphical representation of a mathematical function;

b) supplementing each arrangement with a tolerance value; and c) transferring each said arrangement to the medium.

Preferably, these templates are computationally determined and printed onto a medium used to define at least one portion of the cover, with each portion being produced using the template.

Also optionally, these templates are computationally determined and directly transferred to a means for producing at least one portion of the cover.

Also optionally, these templates a computer readable representation of this portion and the means for producing these portions includes an automated cutting machine configurable to cut these portions.

In accordance with another aspect of the present invention, there is provided a computer readable medium comprising a series of instructions operable by a computer to implement a method as recited above.

Preferably, this computer readable medium is selected from one of a magnetic disk, an optical disk and a computer network.

In accordance with another aspect of the present invention, there is provided a system of manufacturing a cover for an article. This system includes:

a) a means for receiving a series of dimensions corresponding to one or more predetermined parameters of the article;

b) a means for computing one or more configurations which can be joined to form a cover for the article, and c) a means for producing one or more templates, corresponding to these one or more configurations, respectively.

In accordance with another aspect of the present invention, there is provided a system for producing instructional diagrams with a personal computer. This system includes an input means for receiving and arranging data related to an article into arrays; a processing means for reading said arrays and tabulating this data according to a pre-determined arrangement, including information about co-ordinate points and mathematical functions provided there between; and an output means for transferring a representation of the information into an instructional diagram.

The present invention incorporates a process that allows an unskilled worker to produce a cover for a three dimensional article by producing a plurality of portions of the cover or a plurality of templates that may be adjoined or abutted one to the other to form the cover.

FIGS. 1–24 show an embodiment of the present invention, a process for manufacturing a cover for an article, as applied to a covering, i.e., upholstery of an article of manufacture, such as furniture.

An item of furniture such as a sofa requires a number of templates which have to be sewn together to make a cover. FIGS. 2A–2G illustrate various sofa styles and corresponding dimensions for each style that are required to be measured in order for an appropriate cover to be manufactured. A sofa normally includes several convex and/or concave curves for which the present invention can be applied. The cover may be manufactured of fabric, leather, vinyl, plastics, animal skins etc.

Further, the present invention may be applied to only some selected surfaces of the article, rather than entire cover.

Normally the templates for a sofa are for the front arm (or scroll)-SC, front front (or skirt)-SK, seat-SE, front back (or inside back)-IB, back back (or outside back)-OB, underarm (or outside arm)-OA, and overarm (or inside arm)-IA. Examples of this arrangement of sofas are shown in FIG., 2H. Additional templates are required on some sofas such as club end-CE, inside wing-IW, outside wing-OW and side step-ST.

The present invention has a 3-dimensional model viewed in three 2-dimensional planes. Measurements are taken at points and processed as described in FIGS. 4A–B to be generated. The conversion of the 2-dimensional planes to determine the end points of a curve is discussed in the description of FIGS. 5A and 5B and illustrated in the example. By choosing vertical and horizontal end points to each curve, it is possible to generate curves presented in FIG. 4A. One curve, Code 3, will need three points and two curves, Codes 24 and 25, which is obtained from neighboring curves.

The definition of the curve is so reduced to a code as shown in FIG. 4A and pointers to where the coordinates of the end points will be held. In this way the values of the end points can be assigned when dimensions are input although the curve structure of code and end coordinate pointers is fixed and independent of these dimensions.

In this way the information for a 3-dimensional model is stored by template. The shape of the template is described by a number of curves. The number of curves is determined by the end points described above, i.e., the total of the number of straight lines plus the number of vertical and horizontal gradients.

Each of these "standard" templates is additionally characterized by a particular style. An example of a series of different styles of templates of the front arm (or scroll) is shown in FIG. 5A.

The outline of the template of FIG. 5A(i) is made up of several curves which join at locations denoted by reference numerals or "pointers". In this example, the curves link the reference numerals or pointers as follows: 1 to 3, 3 to 5, 5 to 9, 9 to 11, 11 to 13, 13 to 15, and 15 to 1.

Each template includes curves which terminate at a maximum or minimum vertical position such as 11 and 3 respectively, or terminate at a maximum or minimum horizontal position such as 9 and 13 respectively, or terminate at a discontinuity, such as 15 or 1.

Each of the curves of a template such as that shown in FIG. 5A (i) are coded into a three part format and then allocated a data name. An example of the three part coding is as follows. To describe the curve that joins pointers 9 to 11 of FIG. 5A (i), the coding would be 9, 9, 11. The first figure is the "curve code" and the other two figures are pointers to coordinates of the two end points of the curve. The curve codes are used to advise the system of the shape of the curve and are listed in the table of FIG. 4A. The pointers to coordinates are related to the physical dimensions of the furniture and are each defined relative to a fixed data point, e.g. the pointer to co-ordinate point 11 on the diagram of FIG. 5A. In FIG. 5A, reference numeral 1 points to co-ordinates describing the horizontal and the vertical distance of the point from a "data point". In the case of the front arm, the "data point" is a pointer to coordinates for point 1. The formula for the horizontal component of the distance from 11 to 1 is ((fi-fdd)/2) as shown in FIG. 5B.

Having now explained some fundamental concepts, a broad overview of the process and sequence of discreet modules to be executed will be described.

Referring to FIG. 1, there is shown a series of six discrete steps associated with the preferred embodiment. Each step is designated with a reference numeral, which in this instance, corresponds to its order of execution.

In Step 1 of FIG. 1 entitled "Collect Data", data is collected about the sofa to be covered for input to a computer. This step usually includes a visit to the premises of the owner of the sofa, but may not be necessary if the sofa is of a familiar style and suitable photographs are otherwise available.

Assuming that no prior data about the sofa has been stored previously in the computer which could be otherwise retrieved and used for the sofa to be covered, the following data needs to be collected:

1. The customer's Order No.
2. The basic, style of sofa and the style of each of a corresponding set of templates.
3. Various physical dimensions of the sofa (e.g. fi, fdd) as described above in relation to FIG. 5B. The measurements can be recorded on a standard pro forma document such as that shown in FIG. 2, where each view of the sofa has associated with it a number of height and width dimensions.
4. The locations of, and distances between, several "critical points" on the sofa, which are points of maximum or minimum height, width or depth. The number and presence of critical points to be determined depends on the style of sofa and its complexity of construction.
5. The three dimensional curves of the sofa are also required, the number and type also depending on the basic style of sofa. A three dimensional curve is understood to be one that is curved horizontally, as well as vertically.

Photographic techniques can assist with collecting the data for the critical points and three dimensional curves.

This may be particularly useful when the skill and/or time resources of the person physically measuring the sofa is limited.

In relation to the photographic collection of some critical point data, a suitable contrasting background is provided for the areas being investigated. For example, a black cloth may be placed behind a light coloured sofa, or vice versa. A reference strip is then placed in the vicinity of the area being investigated and photographs taken so that the curves are shown together with the reference strip. The strip can be of length 12 inches (30.48 cm) and height of 1 inch (2.54 cm), and sewn onto a white cloth which is placed tightly over the furniture to highlight the outline being measured. The cloth is fitted such that the 12 inch length is horizontal.

The cloth would be white with a black strip for a light coloured sofa or vice versa for a dark sofa.

In relation to the photographic collection of the three dimensional curve data, a vertically striped cover is placed over the front of the back of the sofa and then photographed with a similarly shaped foil between the camera and the sofa. A "fringe" will thus appear on the photograph which displays varying thickness according to a distance of the camera from the sofa. From this, the horizontal curve of the front of the back of the sofa can be determined. The sofa may also be photographed where the cloth and the foil are both horizontal, so as to determine the vertical curve similarly as before.

The following describes Step 2 of FIG. 1 entitled "Store Design Parameters". This step allows the relevant parameters as described below to be stored in computer files.

Figure 11:
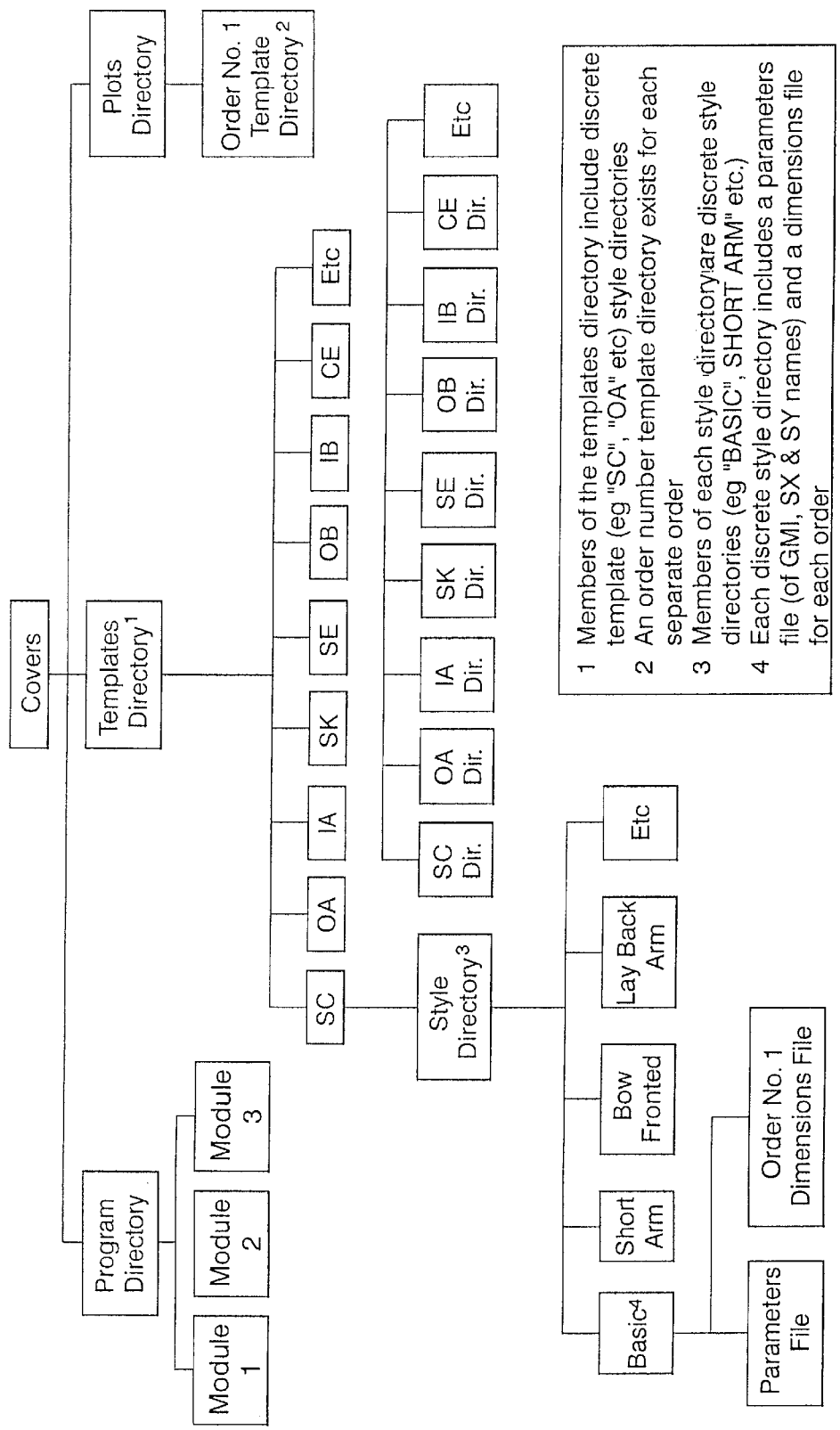
FIG. 11 is a data structure chart used in the preferred embodiment.

In the data structure chart of FIG. 11, modules 1, 2 and 3 reference Steps 2,3 and 4 (respectively) of FIG. 1. The sub-directories of "template" are abbreviations of the various templates: CE for club end, IA for inside arm, IB for inside back, IW for inside wing, OA for overarm, OB for outside back, OW for outside wing, SC for scroll, SE for seat, SK for skirt.

The relevant parameters which are stored in this step are as follows:

1) Curve codes and associated pointers to coordinates (the program stores these values in the array "gmi".

2) Relative position functions. There are two relative position functions for each pointer to coordinate as described above (the program stores these values in the array "sx" and "sy" for the horizontal and vertical components, respectively.)

3) Dimension names. These are the names of the dimensions used in the relative position function the program stores these names are stored in the array "names".

Figure 9:
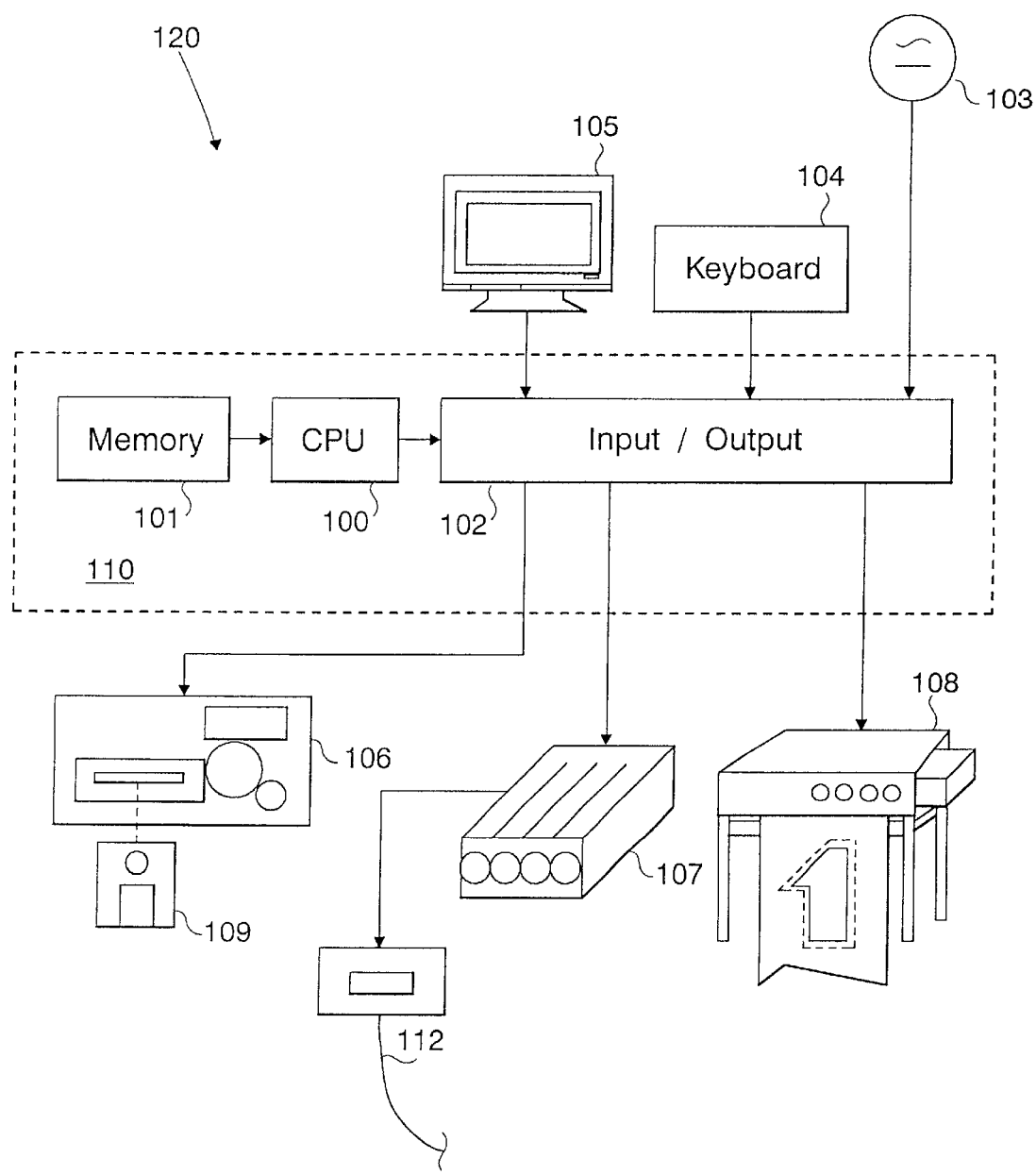
FIG. 9 is a system block diagram of a personal computer system and ancilliary components used to implement the preferred embodiment.
Figure 9A:
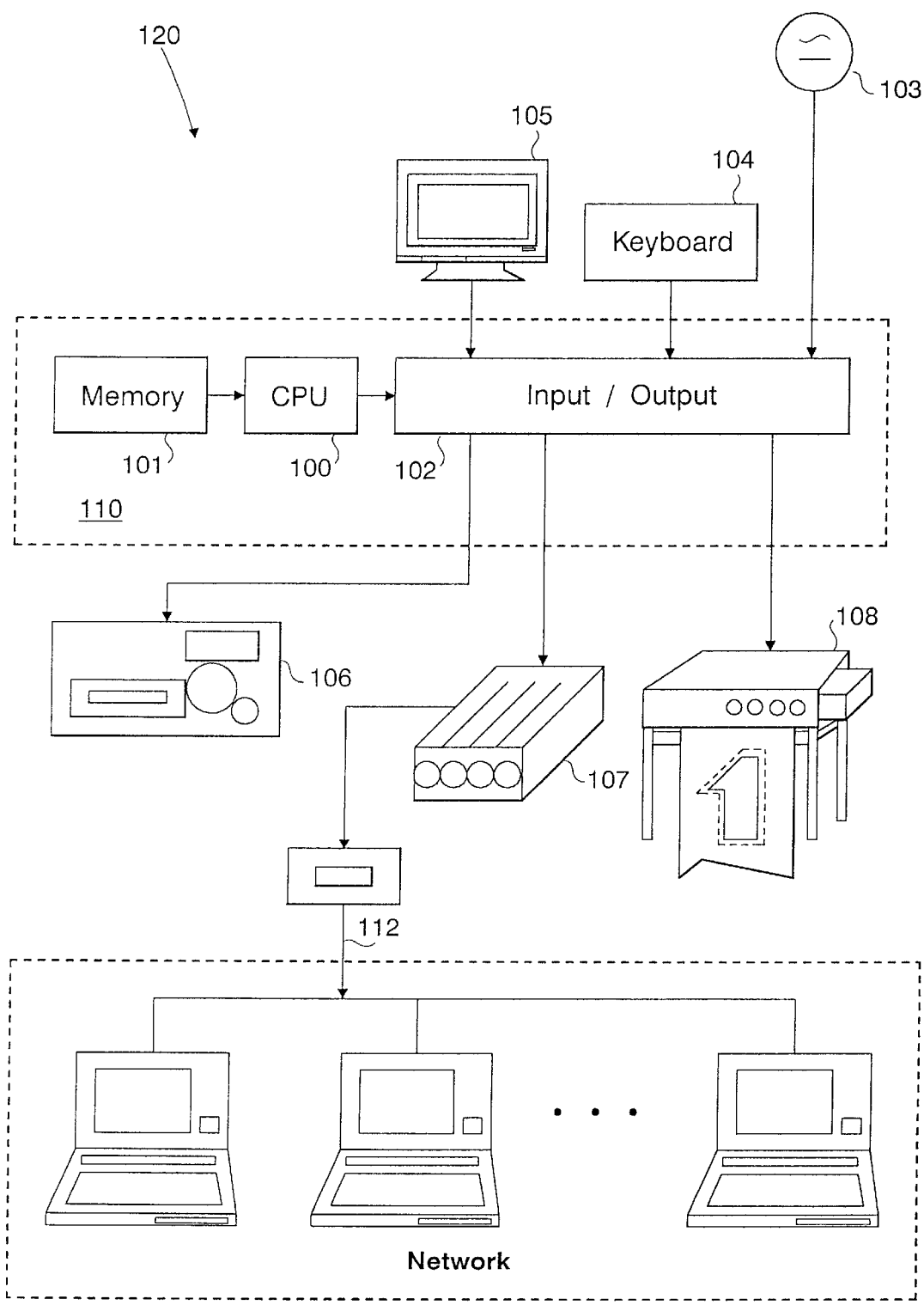
FIG. 9A is a system block diagram of network of computers system and ancillary components used to implement the preferred embodiment.

In Step 3 of FIG. 1 entitled "Computational Transformation", the data collected from Steps 1 and 2 is input to a computer program which is executed within a general purpose computer system 120, such as that shown in FIG. 9. The output of the system 120 is a printed template with sewing instructions to be added.

The computer system 120 includes a computer module 110 having a central processing unit 100 connected to a memory 101, which typically includes hard disk (magnetic) memory and semiconductor memory. Also included is all input/output module 102 which can interface with various devices including a power supply 103, a keyboard 104, a VDU display screen 105, a floppy disk drive 106, a modem 107 coupled to a communication network 112, and a plotter/printer 108.

The computer program is typically stored in the memory 101 and an example of such, written in MATHEMATICA, is provided in Appendix A, provided herein as a computer diskette in Microsoft Word 7.0 pursuant to 37CFR 1.96(C)(2).

Figure 3:
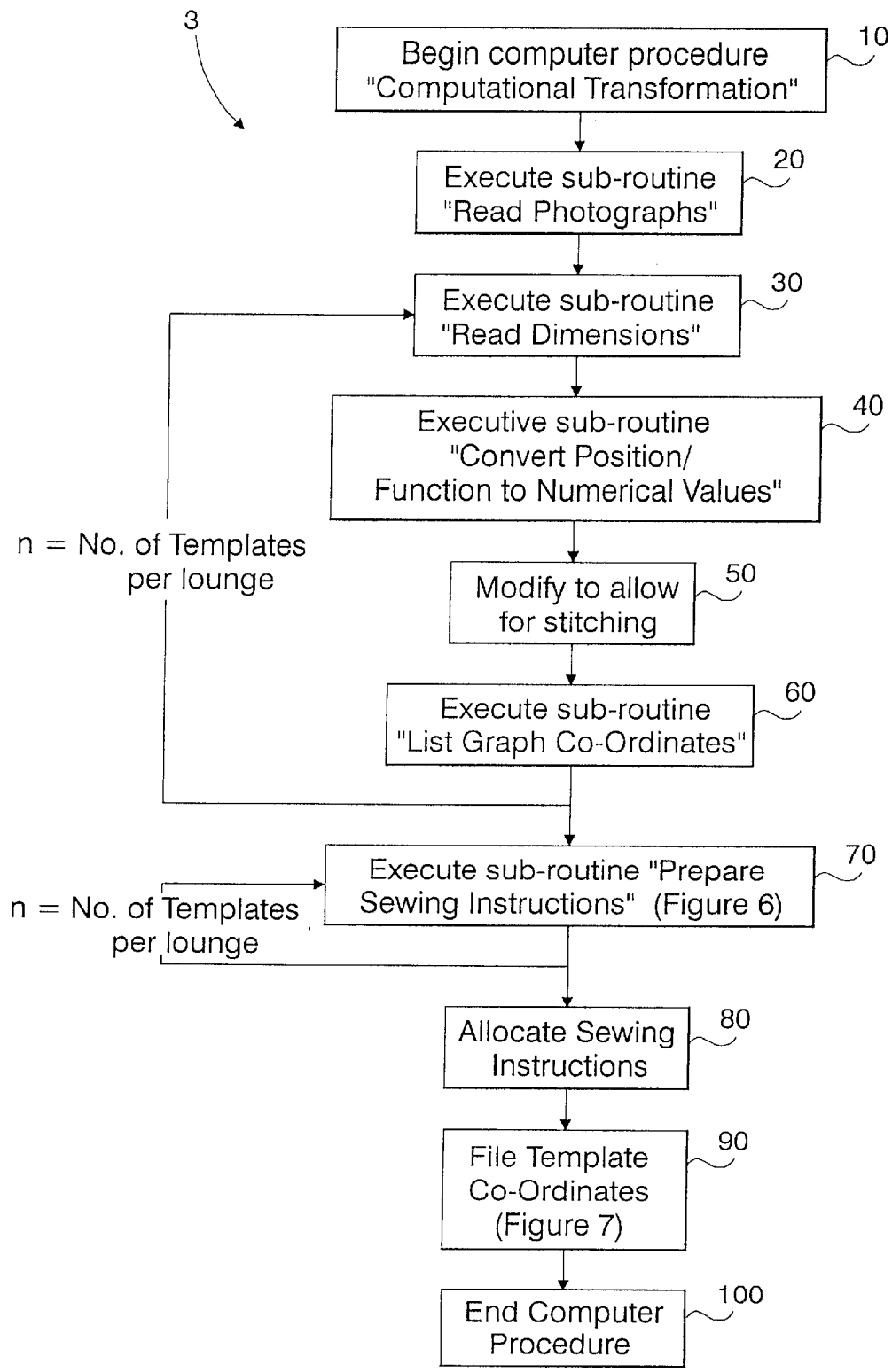
FIG. 3 is a flow chart for explaining the main computer procedure used in the process of FIG. 1.

The following pseudocode in conjunction with the flow chart of FIG. 3 describes the various method steps that occur within "Computational Transformation".

```
For each template
    List the curve points and display template Read photographs (Step 20)
For each template
        Read dimensions (step 30)
        convert position/function to numerical values (Step 40)
        If normal point
            Convert normally
                Else
                Convert special points
                    For each template
                Modify to allow for stitching (step 50)
                    List graph coordinates (step 60)
        For each curve
            Calculate graph coordinates
Display template on screen
End
```

The first sub-step 20 of Step 3 is a procedure entitled "Read Photographs", from which a number of significant features can be determined as will now be described.

Critical Points can be determined using the "Extreme Points Method" from the photographs which have been input. With the Extreme Points Method, firstly, the area of the sofa of interest is magnified using a zoom facility. Next, a bit mapping computer program converts the enlarged image of the photograph into binary 0's and 1's. The 0's represent the sofa and the 1's represent the background. This provides an image of the edge of the sofa which represents the curve and allows the extreme points to be ascertained. Suitable scaling then enables the correct Cartesian Coordinates to be evaluated.

Three dimensional curves can be determined using the "Moire Fringe Method" from the photographs which have been input. An example of a three dimensional curve is the front of the back of the sofa which is often curved horizontally as well as vertically. It is difficult to physically measure these curves accurately. By placing a cover with vertical stripes over the front of the back of the sofa and photographing the front of the back of the sofa with a foil which also has vertical stripes at some distance between the camera and the sofa, a fringe will appear on the photograph. This will display varying thicknesses according to the distance of the camera from the sofa.

Figure 10:
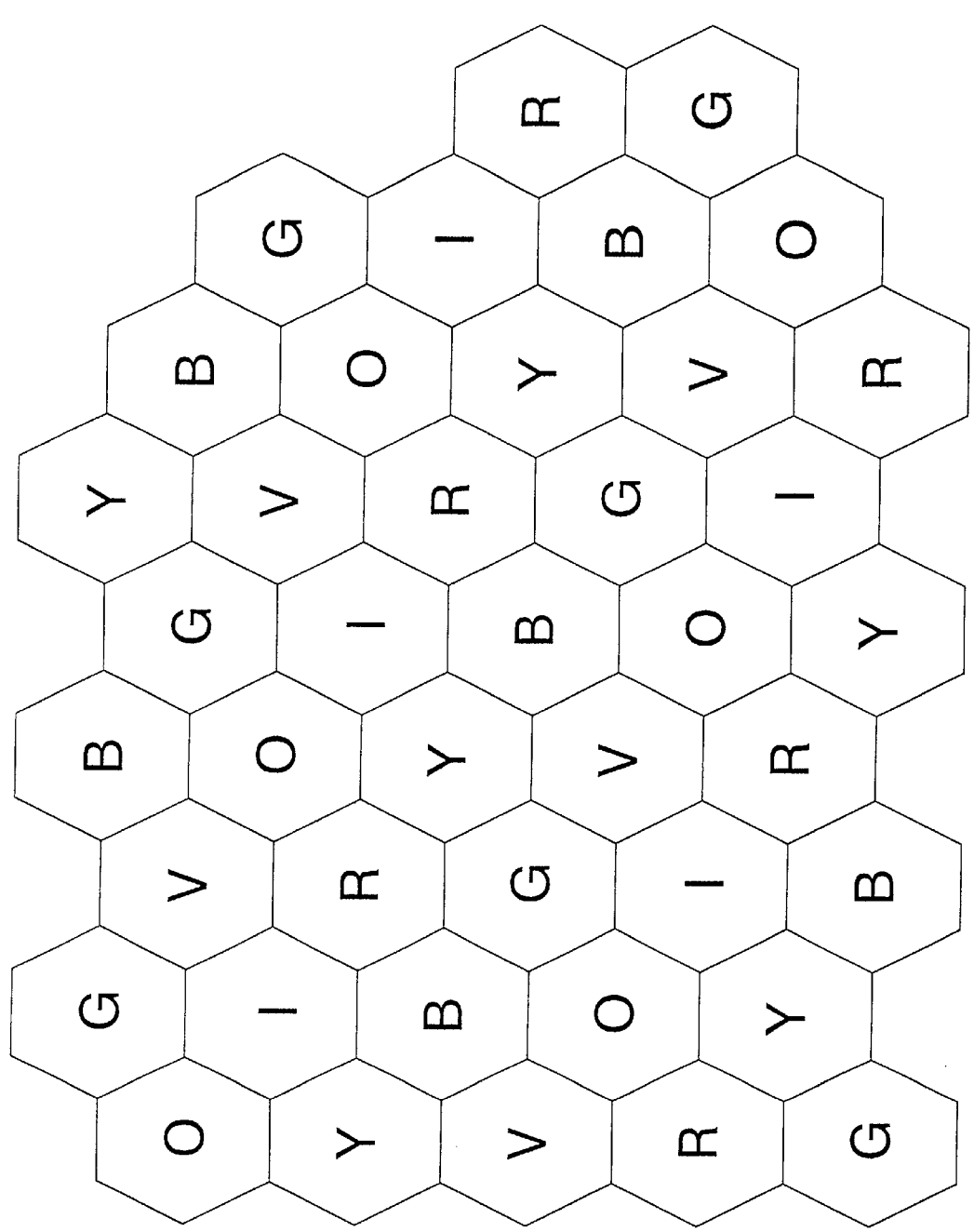
FIG. 10 is a diagram of a hexagon cluster for explaining a principle upon which an embodiment of the present invention is based.

A further aid to these photographic techniques includes the use of a Hexacloth developed by the present inventor. This is a specially designed cloth with a pattern of hexagons shown in multi colors as indicated in FIG. 10. The sides of each hexagon are 1 inch (2.54 cm) in length. This can further improve the accuracy of some measurements.

The principle by the which hexacloth is based lies on the fact the hexagon is the only symmetrically polygon which tiles perfectly i.e. the distance from the centre of one hexagon to a neighbour is equidistant. This is in contrast to tiled squares. Therefore, the hexagon can be used advantageously for digitally imaging two dimensional space. Further, by colouring each cluster of hexagon as shown in FIG. 10 (r=red, b=blue, g=green, o=orange, y=yellow, i=indigo, v=violet) the seven colours of the rainbow will make it easy to obtain two dimensional coordinates of covers spread in a three dimensional shape to cover furniture.

It can be appreciated from FIG. 10. that the clusters "spiral". The red from one cluster has different x and y coordinates to that of any of the other clusters. A special set of known mathematical algorithms is employed using numbers to the base 7 to manipulate (eg: transpose, rotate, magnify) images of this form.

These measurements are input having been taken in a 2-dimensional form (See FIGS. 2A–H). The front, back and profile views of the chairs are used and measurements are taken at critical points of the furniture to enable mathematical functions to be established. These points occur where the curve gradient reaches horizontal or vertical position or where a straight line ends. The technique is described further in the section on curve codes discussed above with respect to concave and convex curves shown in the prior art drawing FIGS. 2A–2G.

The next sub-step 30 of Step 3 is a procedure entitled "Read Dimensions". Here, the data from Steps 1 and 2 are arranged into a working database of measurements for the lounge. Where parameters are not already available in the database, the operator is prompted to enter the relevant information. The following pseudocode describes "Read Dimensions" in detail:

```
Key in Order Number
For each template
    Key in style
    Set directory to template/type/style
    Read design parameters
    Read order number if prompting desired or 'In" if new Initially or
    if re-entry of dimensions requested
    For each dimension required (for this template)
        If dimension stored previously
            Don't allow change of dimension
            If not acceptable
                Abort
                Endif
            If initially
                If order prompting
                    Get dimension
                Endif
            Endif
        Endif
        while dimensions not accepted
            Key in dimension
        Endwhile
Endfor
Display all dimensions
If all dimensions not acceptable
    Set re-entry request
Endif
Endif
If order to be saved
Save it
Endif
Endfor
```

Once all the measurements of the lounge have been obtained they are converted to numerical values and stored in a three dimensional array. This occurs in Substep 40 of Step 3 with a procedure entitled "Convert Relative Position Function to Numerical Values". The following pseudocode describes "Convert Relative Position Function to Numerical Values" in detail:

```
For each pointer to coordinate or pseudocoordinator
Set pointer to x- coordinate
    While has not evaluated y coordinate
        If not pseudocoordinate
            If accuracy check not required
                Convert normal point to numerical value
            Else
                Convert point from photograph to numerical values Endif
```

```
        Else
            If arc length needed
                Calculate arc length
            Endif
            If point to be calculated
                Guess position
                Calculate arc length
                Compare arc length computed to arc length input
                Display difference
                If difference not tolerable
                    Abort
                Endif
            Endif
            Convert pseudocoordinate to numerical value
        Endif
Set pointer to y coordinator
Endwhile
Endfor
```

Substep 50 of Step 3 entitled "Modify to Allow for Stitching" is executed next. This step builds in an allowance to allow extra cloth for stitching. This step is required in early stages of the development of the program. It involves reading information which has been input by an operator and includes tolerances to be created on each of the templates to create borders in places where stitching and piping etc. are required. Adjustments are made to each template by increasing some coordinates and reducing others. The tolerances required are usually reasonably uniform and predictable, but the early stages of the evolution of this manufacturing process, they are read as inputs to the computer system. These adjustment figures are stored in an equivalent 3 dimensional array of the same structure. This module merely adds the two 3 dimensional arrays together.

Figure 12:
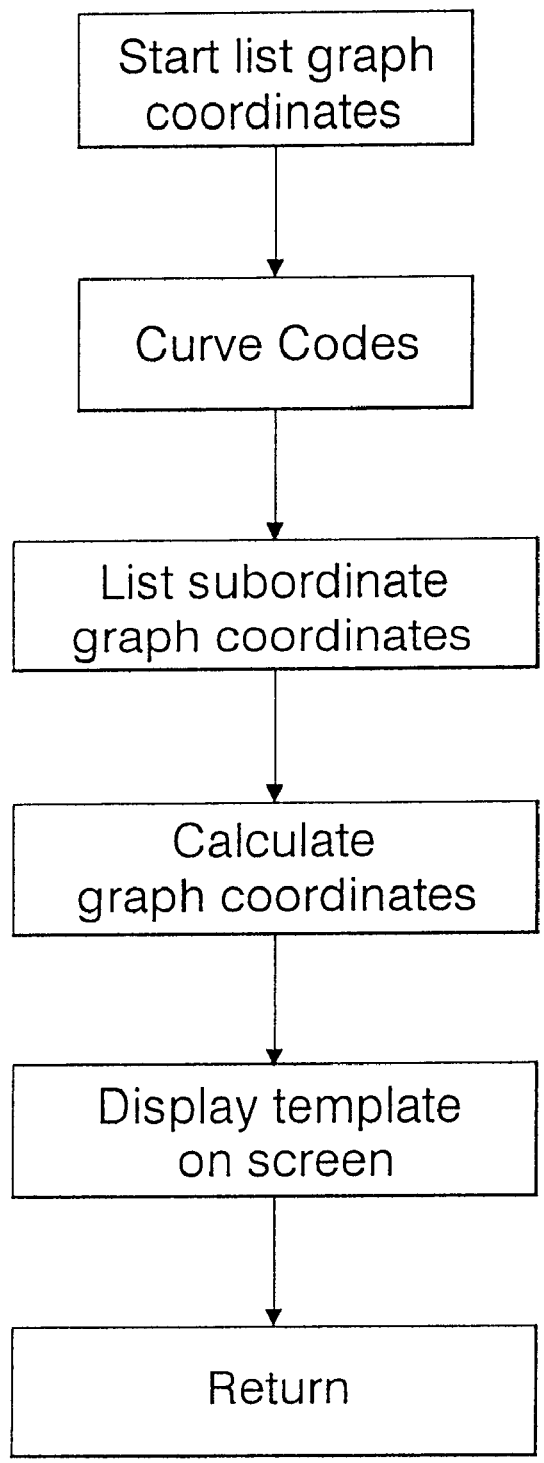
FIG. 12 is a flow chart for the "list graph coordinates" subroutine.

Substep 60 of Step 3 entitled "List Graph Coordinates" is executed next, and as seen in FIG. 12 which manipulates the data stored in the three dimensional arrays and converts it to graph coordinates which correspond to an outline of the template. The following pseudocode describes "List Graph Co-ordinates" in detail.

While more curves for this template
    If curve does not connect to other template or to tuck-aways Retrieve numerical values of end points for next curve Calculate curve for this category of curve with these end points using sub-routine "Curve Codes" (substep 61) If curve has infinite slope
    Swap x and y values Endif
Else
    List subordinate graph coordinates (Substep 62) Endif
Calculate graph coordinates (Substep 63)
Increment curve number for this template i Endwhile
Display template on screen (Substep 6A)

The first substep 61 of Step 60 entitled "Curve Codes" generates a three digit code. The first digit of the code indicates the type of input and output to the curve function as shown in the series table of FIG. 4B, and the next two digits indicate the type of curve to be considered by the curve function, as shown in FIG. 4A

The series table of FIG. 4B shows that an input to this function can be a triad which is up to three numeric values of rectangular coordinates. An alternative input, denoted triad +, provides the same three coordinate values together with an auxiliary input value derived from a previous calculation for the particular curve.

The output of this Substep "Curve Codes" is either:
1. One of the functions indicated in the curves table with numerical values for a,b,c,d and e; or 2. The arc length of this curve between limits specified in the triad.

Arc length+ is the same but again a corresponding auxilliary calculated value is added. Some more complex codes are discussed in Note A (below) for 400 and in Note B (below) for 600 series.

The series 000 to 099 are normal curve functions where a, b and c and sometimes d and e are evaluated as specified in the curve table.

100 to 199 also evaluates a, b and c where one coordinate has been specialty computer.

200 to 299 evaluates the function as for the series 100 to 199 but it outputs the arc length.

300 to 399 again evaluates the arc length but does not use the specially computed coordinate.

400 to 499 discussed under Note A 500 to 599 the arc length is again evaluated but added to the special input value.

600 to 699 determines the position of a point on a curve by improving on an iterative basis a guestimate until the arc length matches an input value. (Note B).

0 Note A: Codes 400 to 499 are reserved for specific arithmetic and other operations. They enable the writing in a macro language where curve calculations such as arc length can be added together or compared within the program itself. The specific codes used are:

451 add input to triad,

452 subtract input from triad,

460 calculate arc length of function which is given in input not in triad, 470 find value of x which makes function given in input equal to triad, 480 compares arc length with input value and displays the error.

Codes 600 to 699 will compute the length of a curve specified by the 0099 digits for an assumed end coordinate. The length of this curve is then compared with an input measurement. A mathematical approach (Newton's Method) is used iteratively to improve the approximation until the correct length is found within an acceptable tolerance.

The pseudocode for the "Curve Function" is as follows. Approximation equals guessed value.
While an approximation is needed and not satisfactory.
 If value computed separately is to be used
  Add this value to the triad.

```
Endif
Calculate parameters (some or all of
If arc length requested.
        Calculate arc length
Endif
If an approximation needed
                a,b,c,d.)
            If difference in arc length-calculated an input is
            acceptable
                Set approximation satisfactory
                Set value to the approximation
    Else
    Improve approximation
    Endif
    Endif
    If value computed separately has to be added
    Add computed value
    Endif
Endwhile
```

The second substep 62 of Step 60 entitled "List Subordinate Graph Coordinates" is provided to handle tuckaways and/or connecting templates. Tuckaways are needed to tuck under the arm or inside back and connecting templates are sometimes needed to connect the front of the front (or skirt) and sometimes to connect the outside back and inside back and sometimes to connect the inside arm with outside arm (see attached diagrams). This step is similar to "Curve Function" Module 61 but handles the subordinate template or tuckaway, i.e., the template or tuckaway which is to be attached to the template being listed.

The third substep 63 of Step 60 entitled "Calculate Graph Co-ordinates" uses the formula for this function to calculate the values of the function, that is the values of y for successive values of x at small intervals between the numerical end points. The routine then determines whether the point would appear on a single sheet of the graph plotter's paper. If not, a test is made to determine if the plot will fit on one sheet if transposed, that is plotted in landscape rather than portrait design. Should it still not fit on one sheet, the graph is assumed to need four sheets referred to as quadrants and the point in question is stored for the relevant quadrant.

Figure 13A:
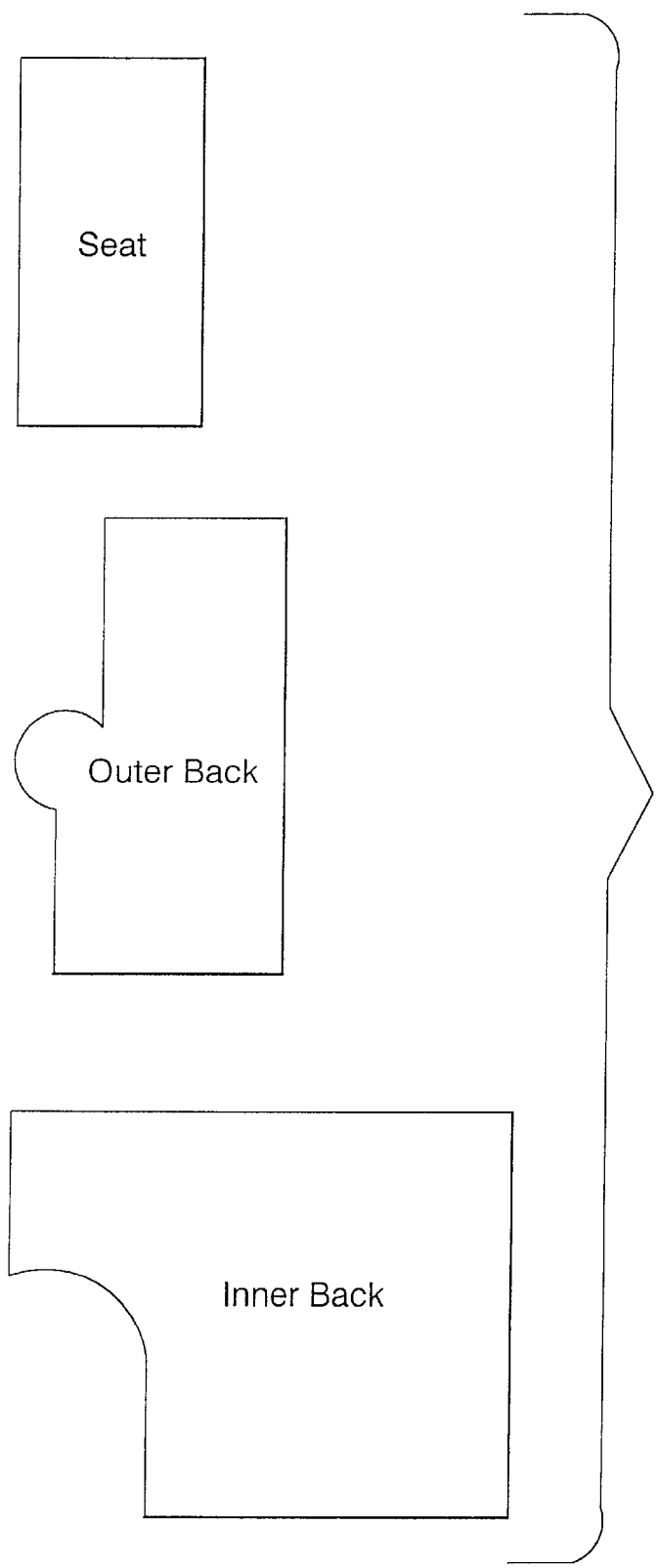
FIGS. 13A and 13B depict templates for an actual cover as they are seen on a video display.
Figure 13B:
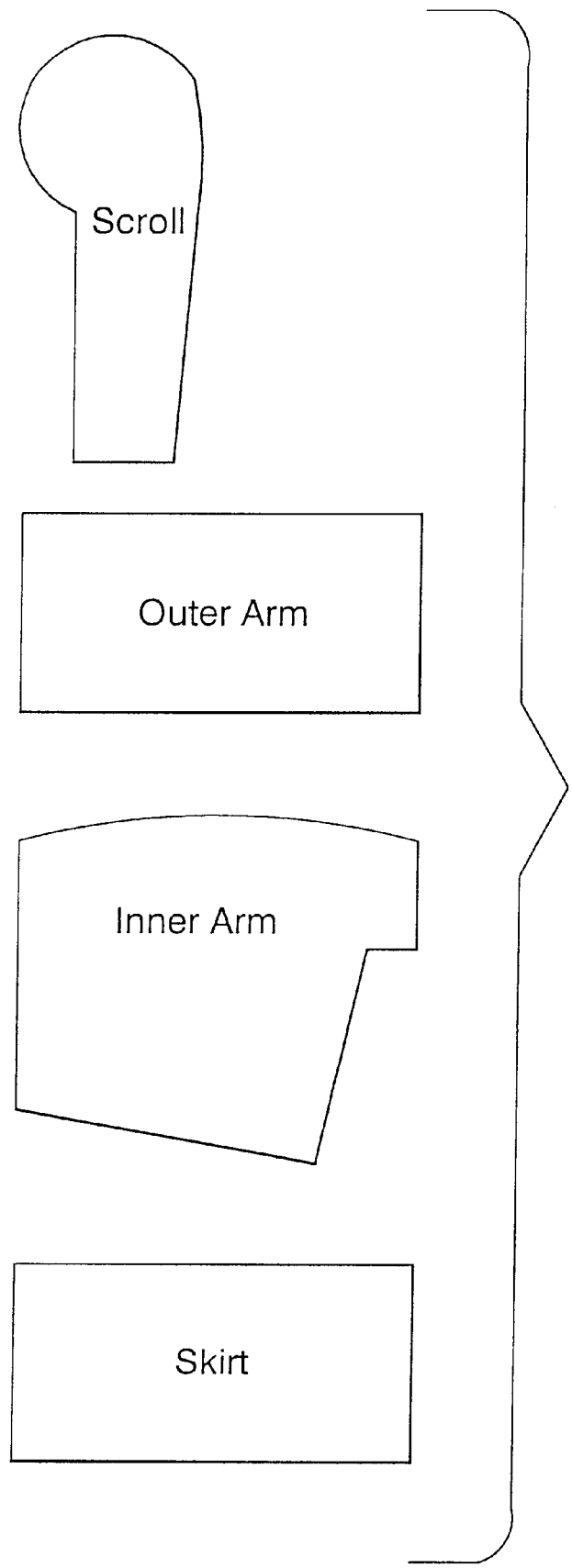

The fourth substep 64 of Step 60 entitled "Display Template on Screen" displays the template on the screen to enable the operator to verify that all the data has been entered correctly. Any error in the input will usually cause the template shape to be unworkable. FIGS. 13A and 13B illustrate actual templates displayed on the screen for a certain sofa on which development of the present invention was actually performed.

In Step 70 of FIG. 3, a procedure entitled "Prepare Sewing Instructions" is executed. This allocates sewing instructions for each template where required. Sewing instructions are needed because templates are sewn together which have edges of different lengths. This situation commonly occurs because of the three-dimensional configuration of furniture. For example, if one fitted template of the cover is flat and another is curved, the common edge will be longer on the fitted curve template than it is on the flat template. Therefore, it will be necessary to sew pleats into the curve fitted template. Unless the relationship of these lengths and position is specifically defined and illustrated, it will be difficult to sew the templates accurately in the absence of the furniture. Step 70 will now be described in further detail with reference to FIG. 6.

Figure 6:
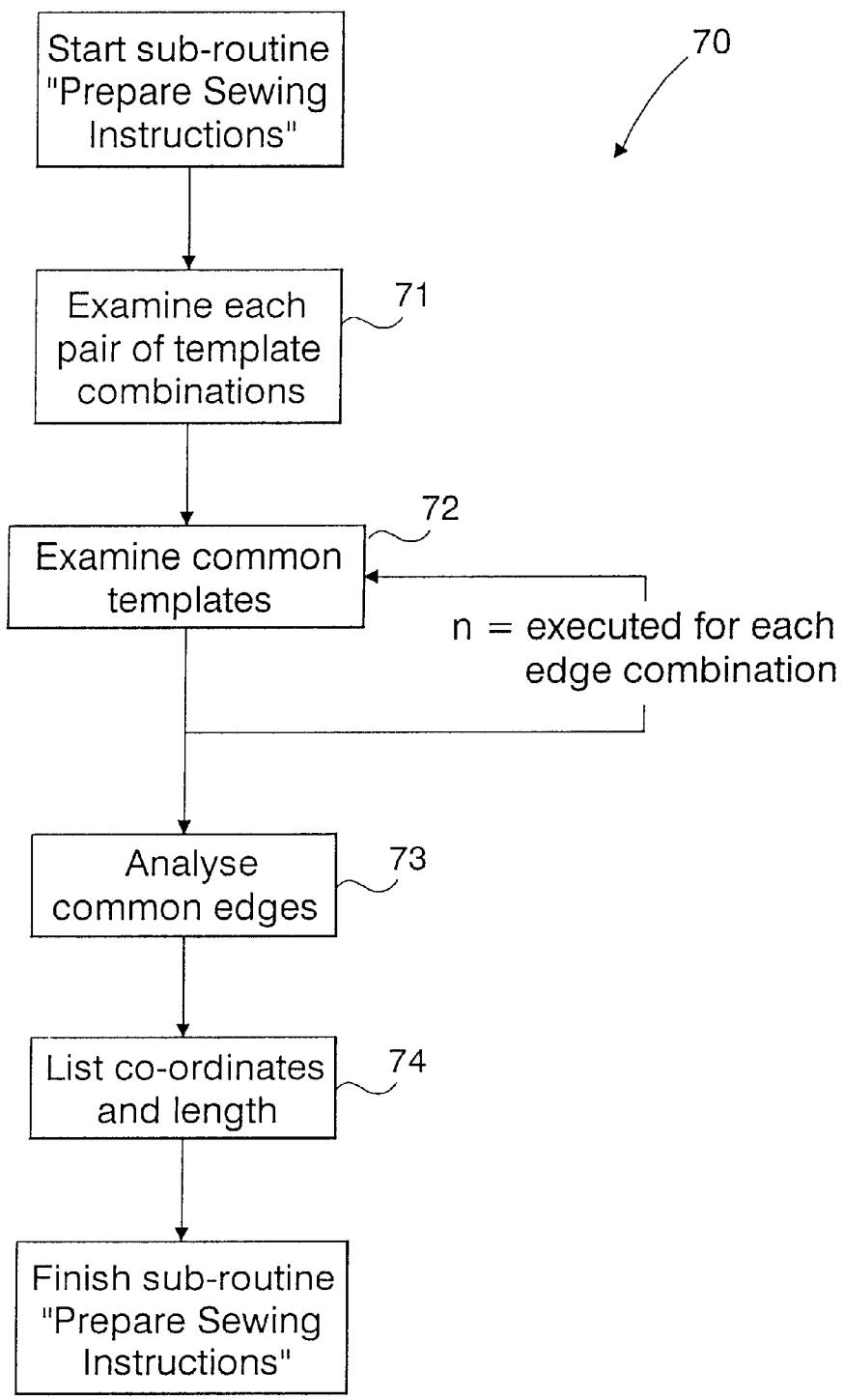
FIG. 6 is a flow chart for explaining the "prepare sewing instructions" subroutine used in the computer procedure of FIG. 3.

In Step 71 of FIG. 6 a procedure entitled "Examine Each Pair of Template Combinations" is executed. Here, adjacent templates are searched and identified.

In Step 72 of FIG. 6 a procedure entitled "Examine Common Templates" is executed. Here, all combinations of edges are tested to determine those which will require specific instructions. Step 72 is repeated for each edge combination.

Step 73 which follows executes a procedure entitled "Analyse Common Edges". Here, the positioning of the common edges on each template is calculated.

Procedure 70 is concluded by Step 74 entitled "List Co-ordinates and Length". Here, the starting and finishing co-ordinates, together with the lengths of the common edges are listed.

A different embodiment of Step 3 shown in FIG. 1 will now be described with reference to FIGS. 8 and 15 to 18. This different embodiment is depicted as Step 3A in FIG. 15.

Figure 15:
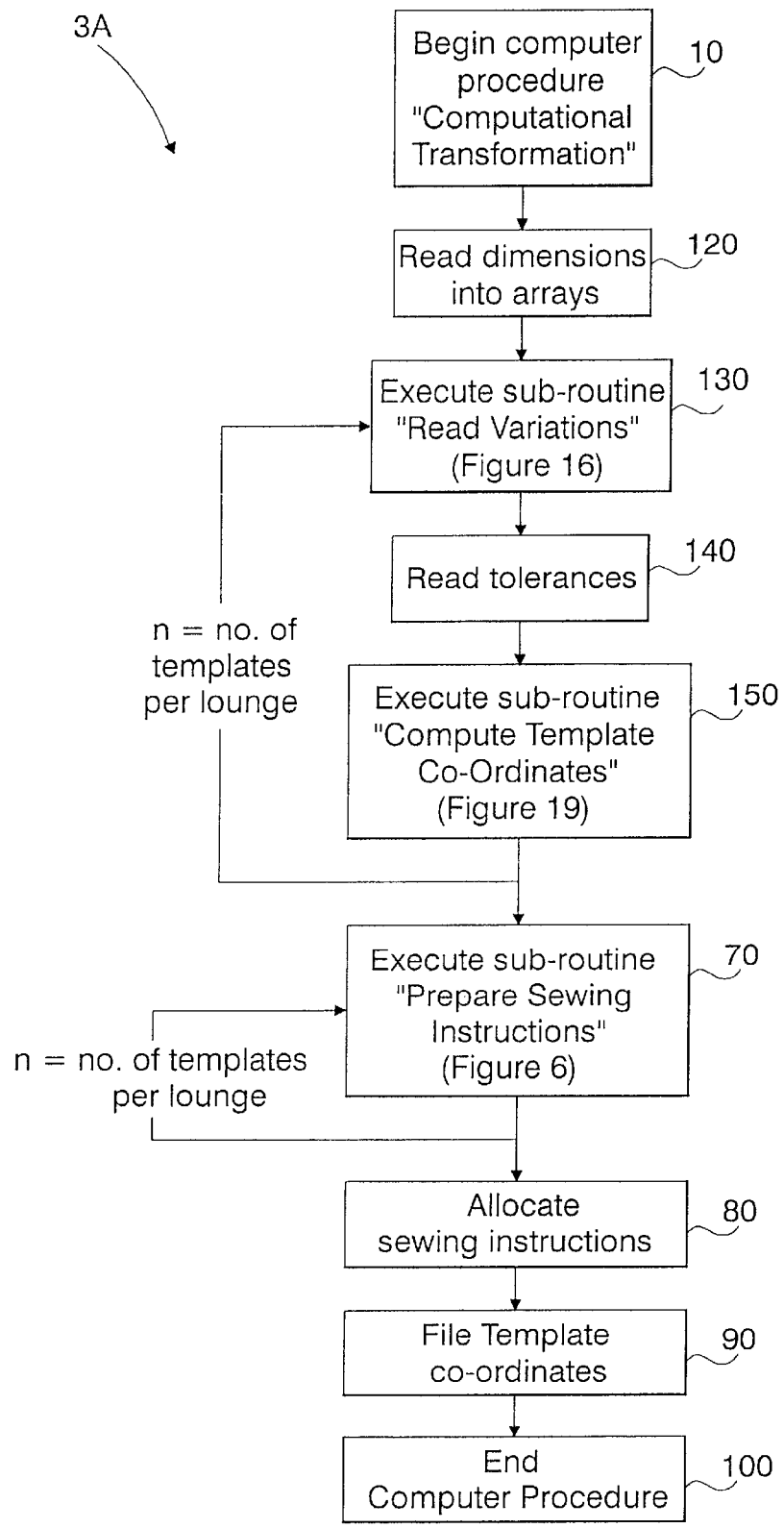
FIG. 15 is a flow chart for an alternative embodiment of the main computer procedure used in the process of FIG. 1.

In Step 130 of FIG. 15, a sub-routine entitled Read Variations is executed. Here, a series of theoretical templates are created and stored in memory 101 of FIG. 9. This creation and storage will now be described in further detail with reference to FIG. 16.

Step 131 calls the sub-routine and passes to Step 132 entitled Read Contours. Here, a default theoretical template is created by allocating several positions on an (X,y) grid in the computer memory 101 as shown in FIG. 9. Each position corresponds to a co-ordinate pair.

The resulting shape of the default template is influenced by the style of furniture to be covered. An example of a default template resembles that of a chess bishop, such as that shown in FIG. 8. For each template, integers are used to identify each of the co-ordinate pairs. Only odd numbers are used for the default templates to allow for further sequential co-ordinate pairs to be added during the development maximizing flexibility and/or expansion.

Figure 8:
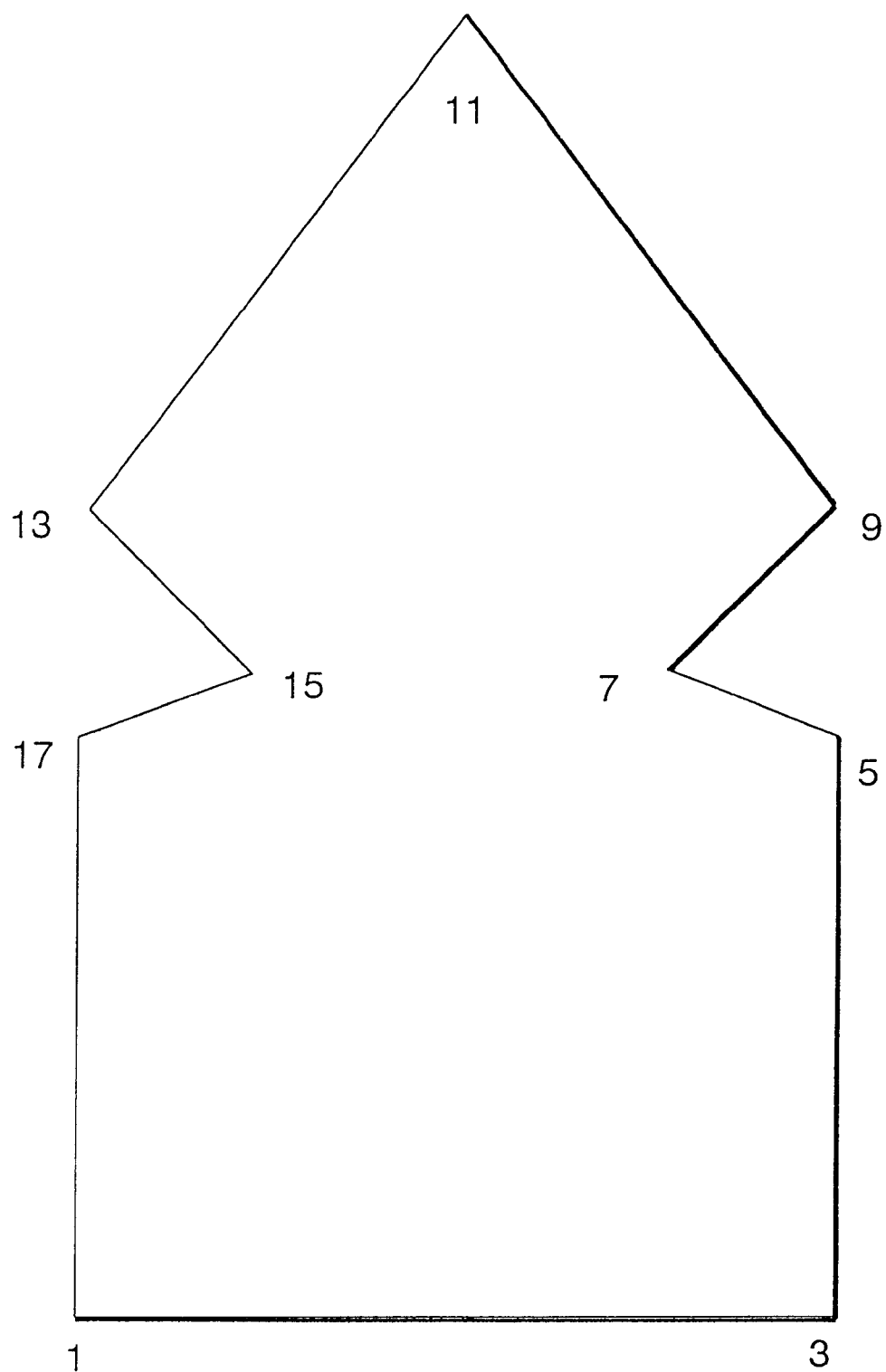
FIG. 8 is an example of a generic template originated in computer memory.

The positioning of each of the co-ordinate pairs both in the default theoretical templates and in final printed templates are intended to provide a guide as to the relative positioning of each co-ordinate pair. Referring to FIG. 8 for example, the coordinate pair at point 1 is preferably always at the bottom left of the template and the co-ordinate pair at point 3 is preferably always at the bottom right of the template. Co-ordinate pairs 9 and 13 are preferably are at the top or near top right and left respectively of the template. Similarly, the co-ordinate pair at point 11 should be at the very top of the template etc. This designation and frame of reference is helpful when the loose cover is being physically manufactured so that information can be taken from the templates rather than being required to be taken from the actual lounge.

Number 18 is reserved to indicate whether the template will be plotted upright or on its side (i.e., at 900 rotation). Numbers 19 and 20 are reserved for designating the maximum and minimum coordinate pairs respectively. For example, (−180,0) could be a minimum co-ordinate pair and (1560,650) could be a maximum co-ordinate pair where point 13 or 17 is located 180 mm to the left of point 1; point 9 is 1560 mm to the right of point 1 and point 11 is 650 mm higher than point 1. Numbers 19 and 20 assist particularly in the plotting or printing process which will be later described.

The co-ordinate pairs are positioned so that each represents a discontinuity or critical point. A critical point is a point on a curve (Xf(x)) occurs where the gradient of the curve at that point (relative to x) is 0 (i.e., horizontal), or infinite (i.e., vertical). Any one of the mathematical functions in FIG. 17, each of which describe a curve, one used to join the co-ordinate pairs.

Over the course of a series of operations of this embodiment, the application develops and returns a record of each theoretical template. Thus, having commenced initially with only a single "chess piece" template as in FIG. 8, over time, a library of templates is developed. With this library, as new data for new lounge covers is read, the library is examined for a first best fit template which then forms the basis of future calculations. In this manner, the computational overhead in developing templates is reduced at the expense increased memory.

Figure 16:
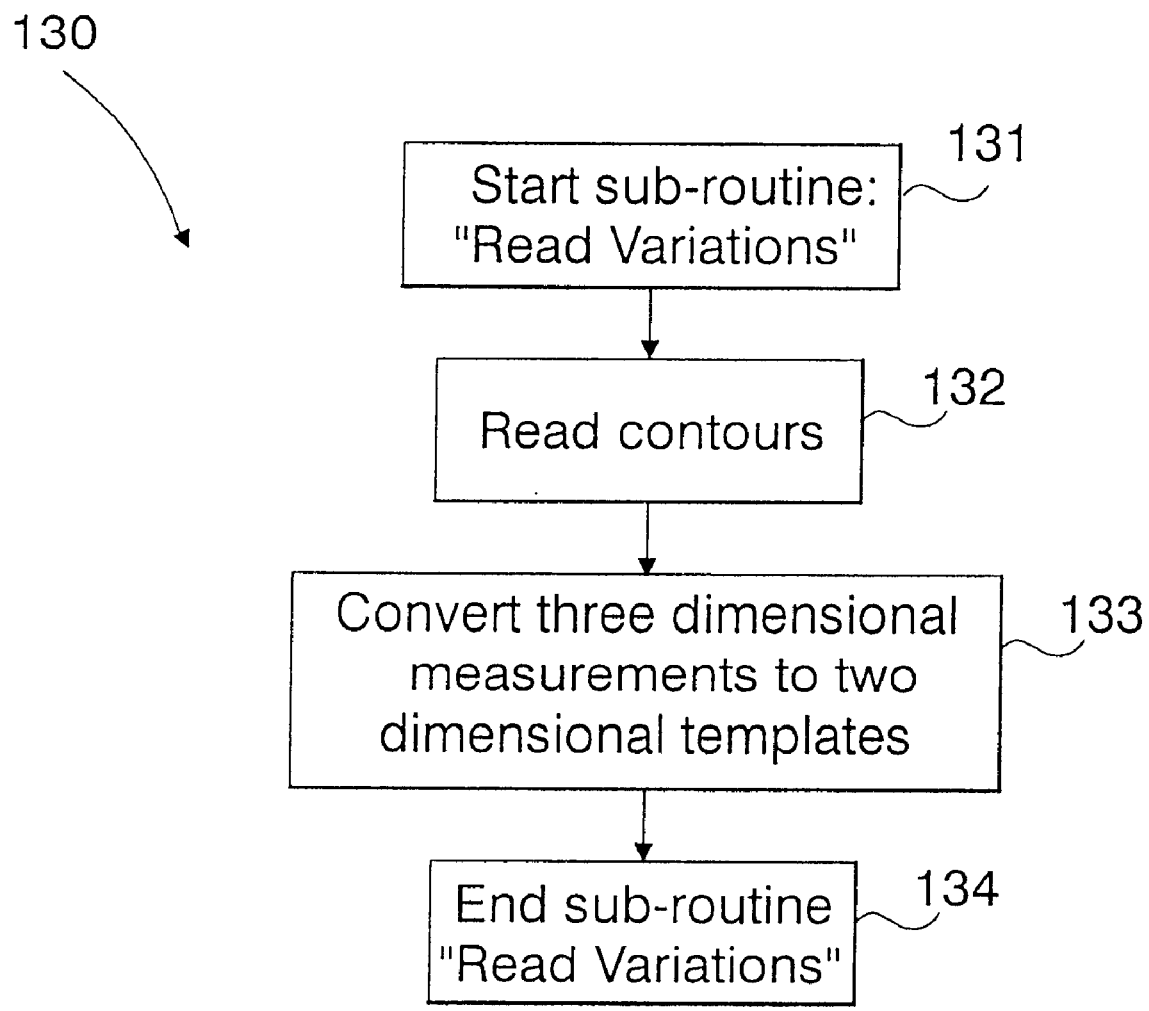
FIG. 16 is a flow chart associated with the flow chart of FIG. 15 of the alternative embodiment, explaining the "read variation" sub-routine.

The next Step 133 of FIG. 16, a procedure entitled Convert Three Dimensional Measurements to Two Dimensional Templates is executed to establish the positioning of co-ordinate pairs for those templates which are to be fitted in three dimensions, but need to be converted to two-dimensions. In order to establish these co-ordinates, a macro language is used. Each macro code compiles mathematical functions according to any of the mathematical operations previously indicated in Step 132, use the same triad of coordinates.

Each macro code of the macro language is of the form 1xx, 2xx, 3xx, 5xx and 6xx, where xx is one of the function codes.

The operation of each macro code series involves a mathematical function f(x) which represents a curve, a triad of co-ordinate pairs and sometimes auxiliary input as follows:

100 series: Generates the curve f(x) from the triad and the auxiliary input.

200 series: Generates the curve f(x) and the arc length from the triad and auxiliary input.

300 series: Generates the curve f(x) from the triad of coordinates and then calculates the arc length of 500 series: Same as the 300 series, but adds the auxiliary input to the arc length.

600 series: Generates the curve f(x) and then determines a missing coordinate given the arc length and the other three co-ordinate end point as the triad.

450–455: Simple transfer and arithmetic operators for addition, subtraction, multiplication and division using the triad and auxiliary input.

460 series: Calculates arc length when f(x) is provided as auxiliary input.

470 series: Solves the equation y=f(x) for x when y is the input.

Figure 18:
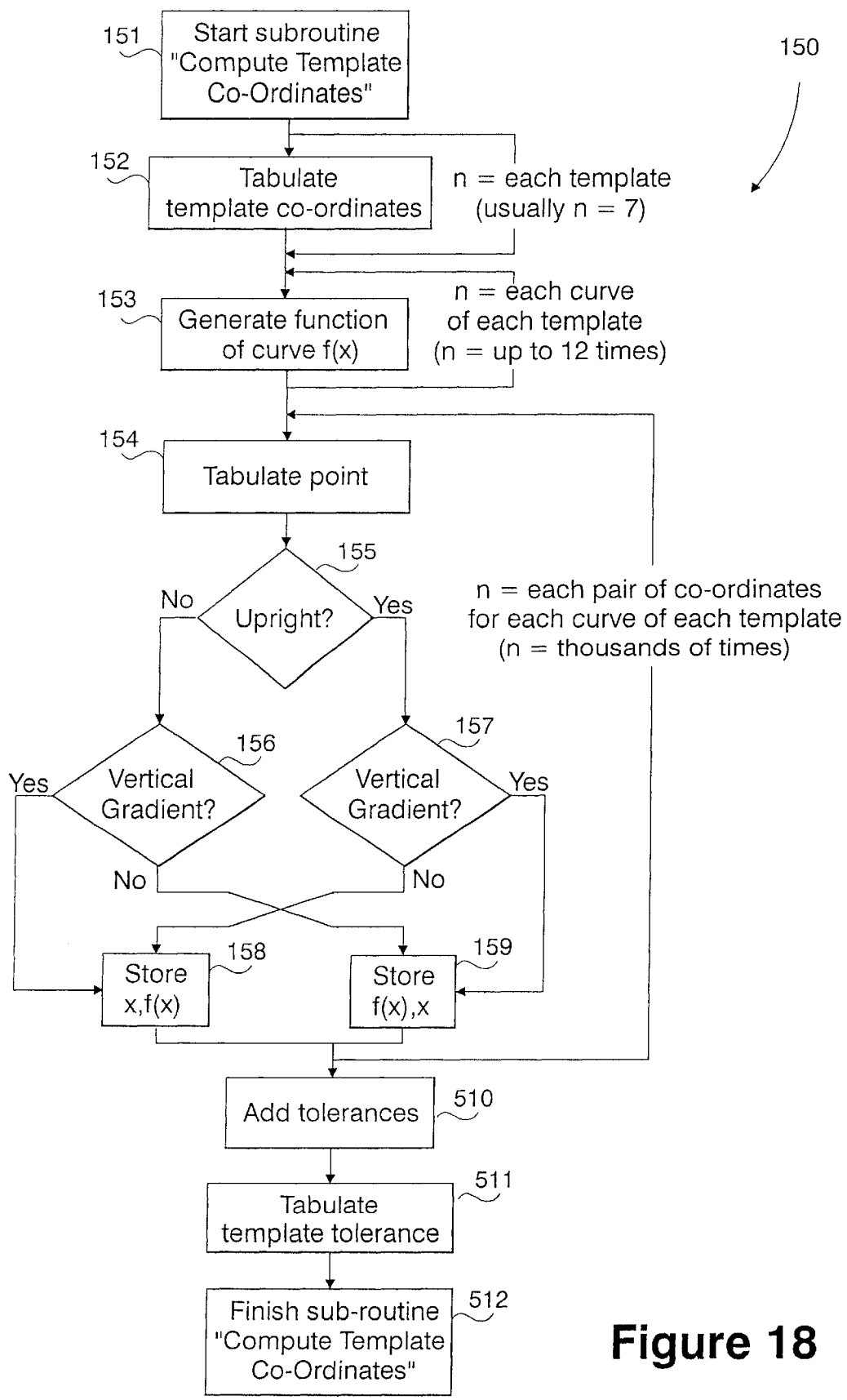
FIG. 18 is a flow chart for explaining the "computer cover templates" subroutine used in the computer procedure of the alternative embodiment of FIGS. 15 to 17.
Figure 19:
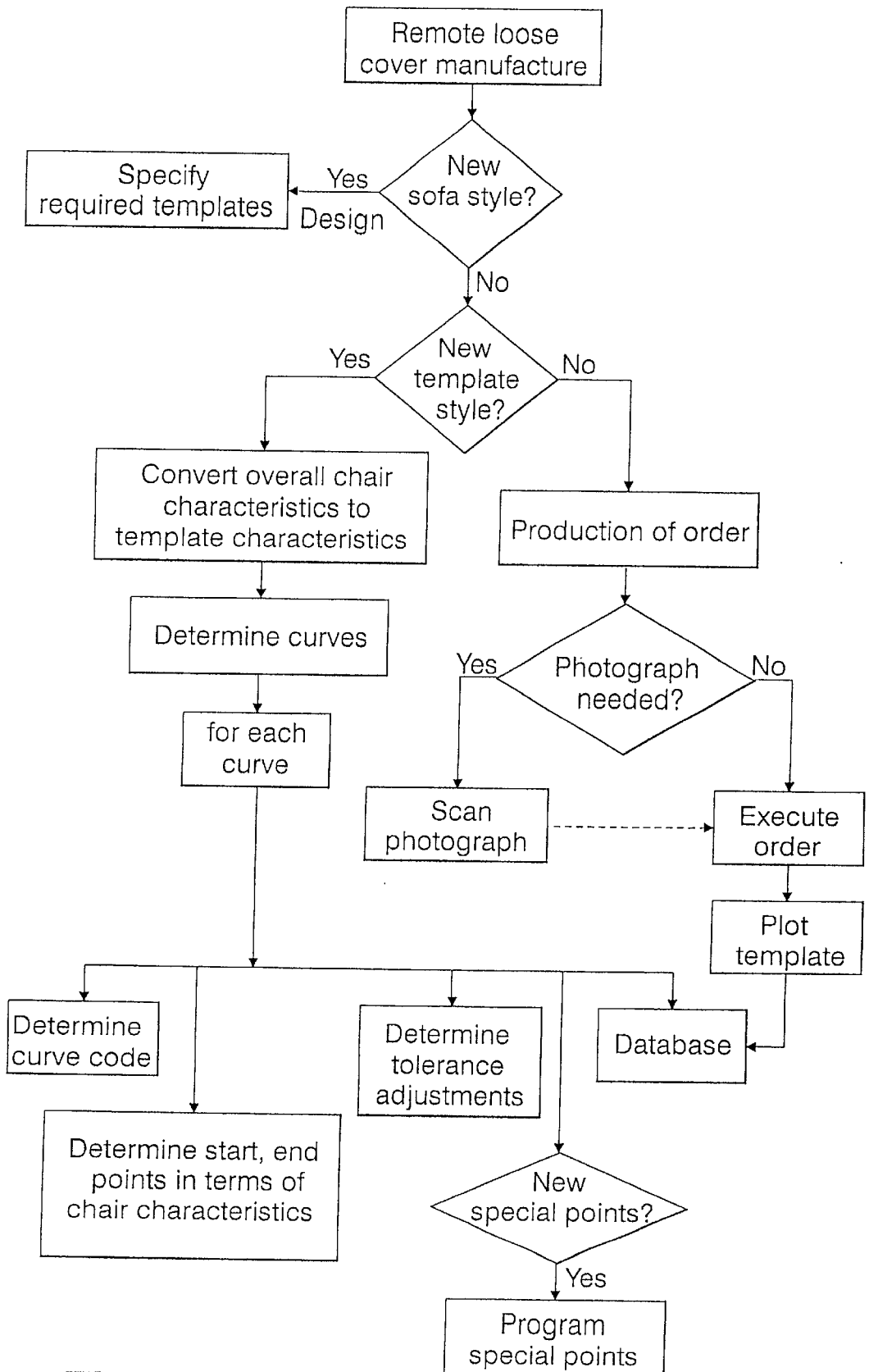
FIG. 19 is a system flow chart.
Figure 20:
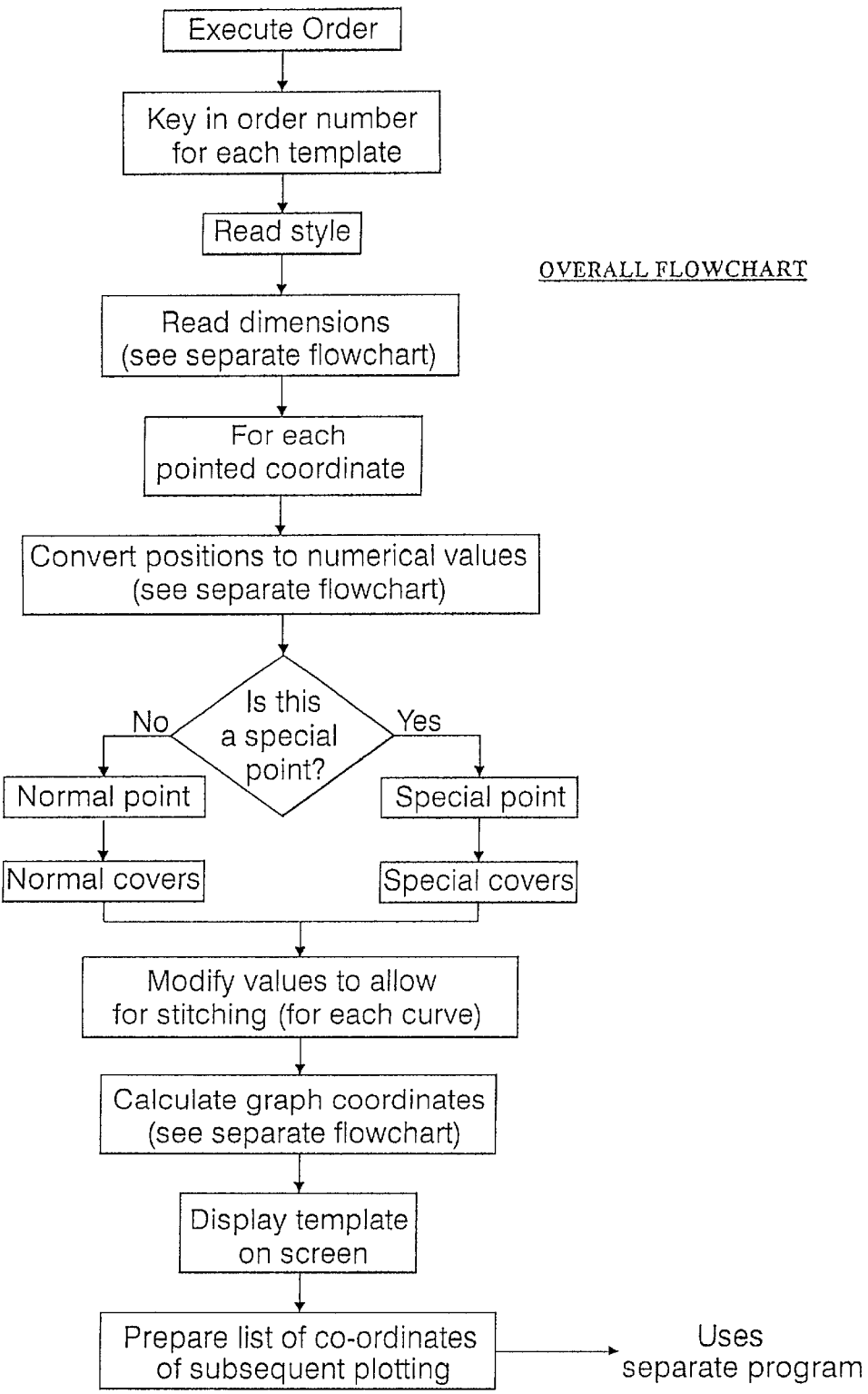
FIG. 20 is an "execute order" flow chart.
Figure 21:
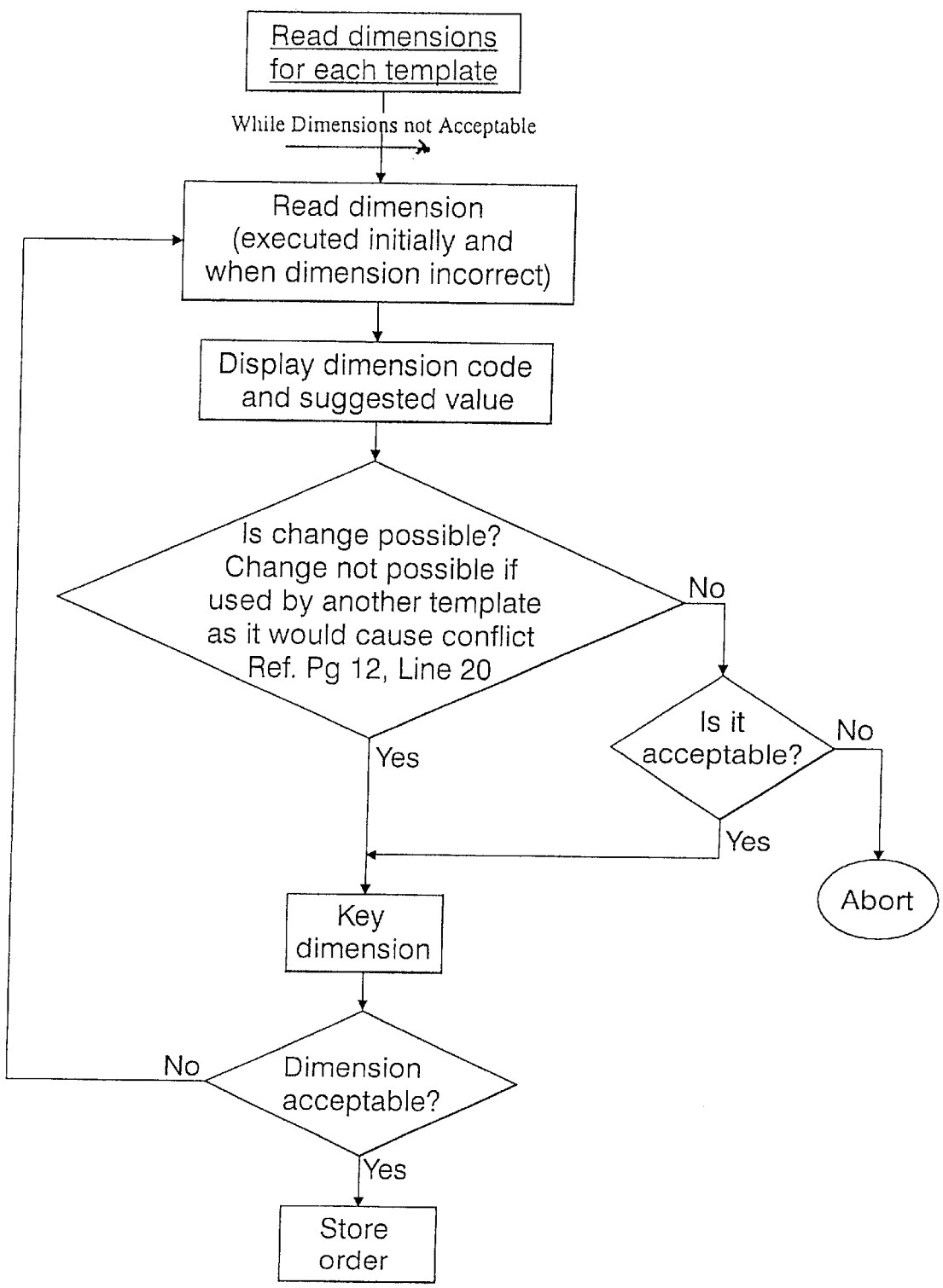
FIG. 21 is an "read dimensions" flow chart for each template.
Figure 22:
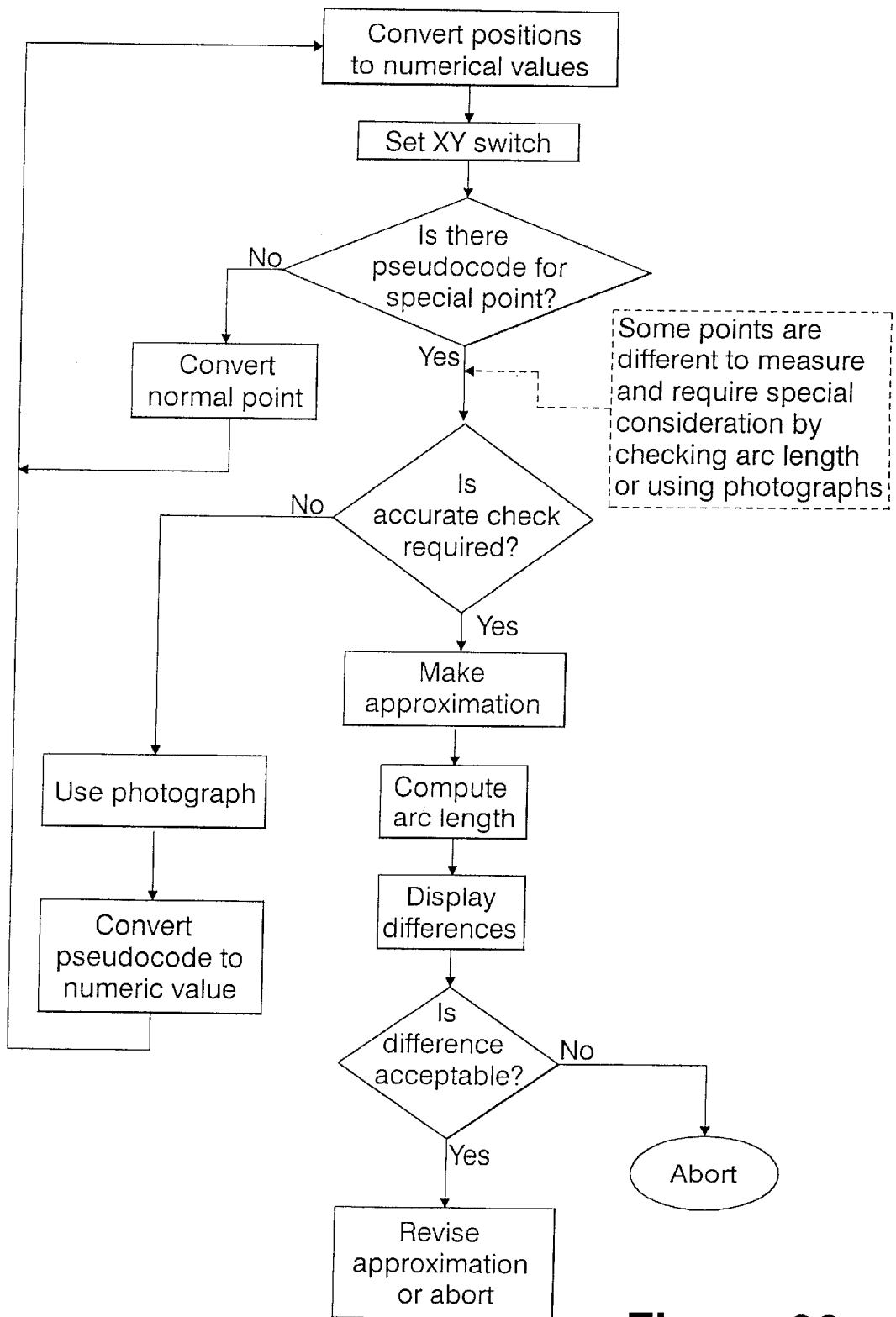
FIG. 22 is a flow chart to convert positions to numeric values.
Figure 23:
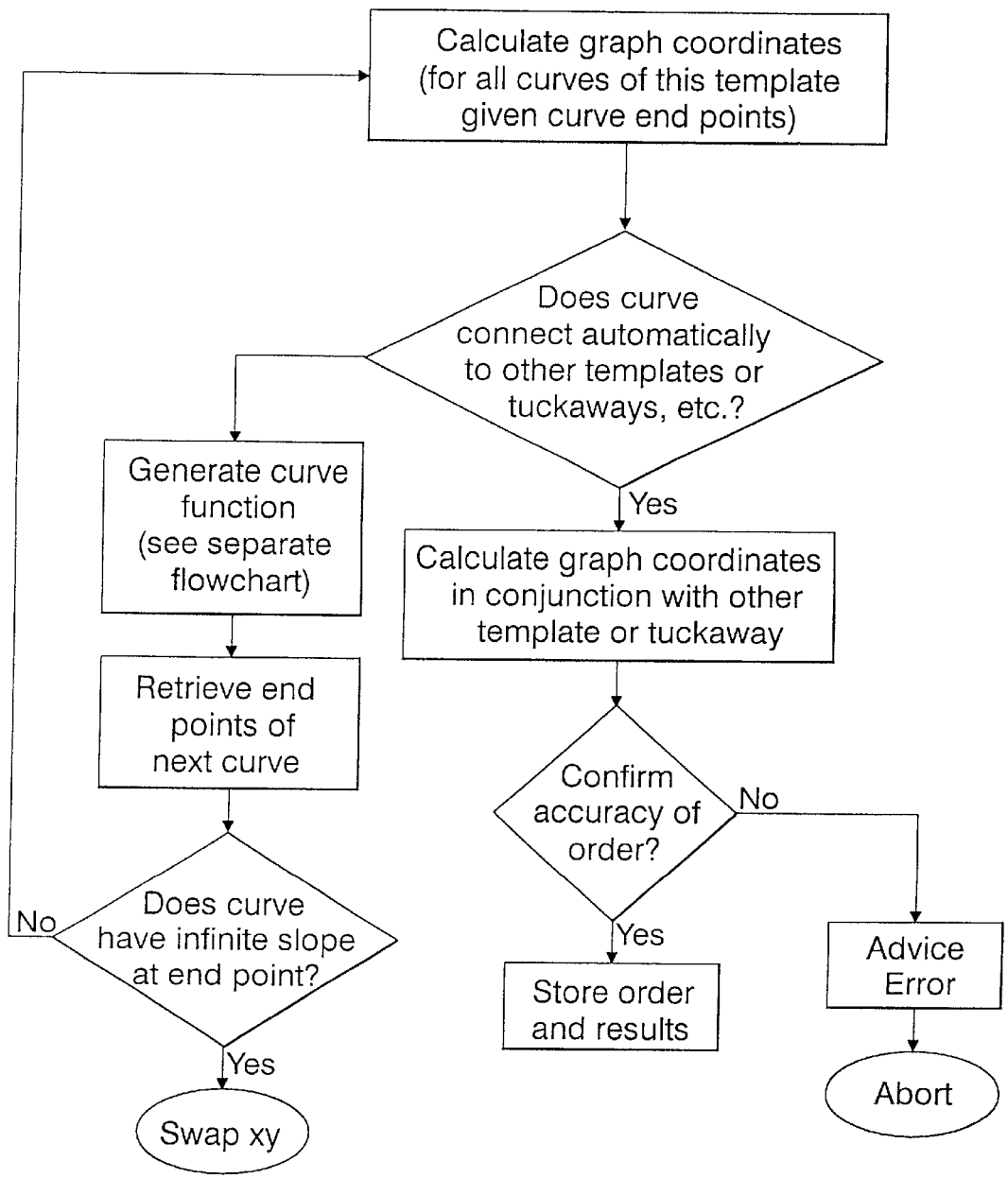
FIG. 23 is flow chart for calculating graph coordinates.
Figure 24:
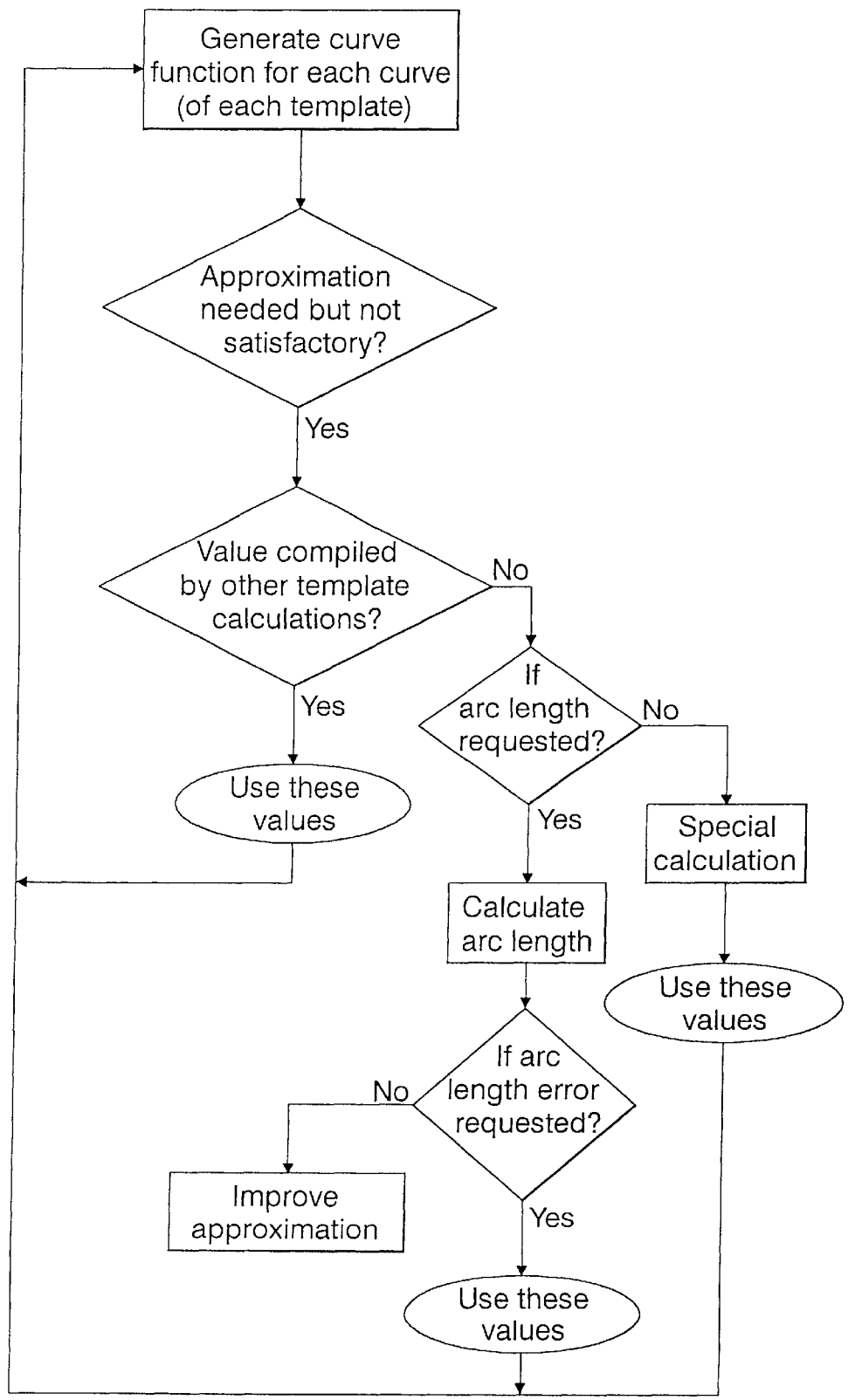
FIG. 24 is a flow chart to generate curve functions.

More complex optimizing routines are provided by way of macro statements to determine measurements that cannot be determined by the facilities of FIG. 18.

Once the three dimensional measurements have been converted to two dimensional measurements, theoretical figures are calculated which provide an accurate representation of the covered furniture. Finally, at Step 134 the sub-routine is complete and a theoretical outline of a template is created.

In Step 140 of FIG. 15, a procedure entitled Read Tolerances is executed. This step is required in the early stages of the development of the program. It involves reading information that has been input by an operator regarding tolerances to be created on each of the templates to create borders in places where stitching and piping etc. are required. Adjustments are made to each template by increasing some coordinates and reducing others.

The tolerances required are usually reasonably uniform and predictable, but in the early stages of the evolution of this manufacturing process, they are read as inputs to the computer system.

In Step 150 of FIG. 15, a sub-routine entitled Compute Template Co-ordinates is executed. This sub-routine takes the information from each of the theoretical templates for co-ordinates which are termed mathematically to be critical points and mathematical functions (as per steps 130 and 140) and produces a record which contains a series of coordinate pairs which represent each point along the borders of each template. These borders refer to both the actual dimensions of the furniture as well as the actual dimensions of the furniture plus tolerances. This will be described in further detail with reference to FIG. 18.

Step 151 calls the sub-routine which then passes to Step 152 to execute a procedure entitled Tabulate Template Co-ordinates.

A number of four dimensional matrixes (k, l, i, j) are formed from this template information, where:

k is a template number, l is a sequential curve number, and (i, j) represent the (x,y) distances from a base point of the template.

Step 152 is a two part procedure which tabulates each template coordinate twice, once with tolerances and once without tolerances. Step 152 is repeated for the number of curves required to define each template.

In Step 153 of FIG. 18, a procedure entitled Generate Function of Curve f(x) is executed. Here, each curve is designated a code or function to define its shape, as listed above. Transposition of x and y is carried out if the respective curve involves vertical gradients. Consideration is given to whether the latter are start or ends points of the curve.

In Step 154 of FIG. 18, a procedure entitled Tabulate Point is executed. This calls for a large range of values within the range of coordinates specified in the contour. The coordinates of a point.will be calculated after increasing the value of x in the specified range.

In the following Step 155, a decision is made in relation to the overall length and width of the final template and how conveniently it will be to plot. If the template can be easily plotted upright, then another question is considered at Step 157. This concerns whether there is a vertical gradient. The answer is determined by searching for a slope of infinity between any 2 co-ordinate points. If a vertical gradient exists, then the coordinates are stored as (f(x),x) as shown in Step 159. Otherwise, the coordinates are stored as (xf(x)) as shown in Step 158.

Similarly, if at Step 155 the template coordinates should be transposed 90°, (i.e., not upright), then the question is again considered at Step 156 whether a vertical gradient exists. If there is a vertical gradient, then the coordinates are stored as (Xf(x)) as shown in Step 158. Otherwise, the coordinates are stored as (f(x),x) as shown in Step 159. It is possible to partition the templates however, it is preferable to alter the rotation as described below if this avoids partitioning.

The sub-routine now passes back to Step 154 and continues this loop until the information associated with an outline of the template produced, through tabulating all co-ordinates.

In Step 510 of FIG. 18, a procedure entitled Add Tolerances is executed. This provides another four dimensional matrix to modify the size of the template to allow for tolerances needed for stitching and piping after the co-ordinates have been stored (at either Step 158 or Step 159). The tolerances can be modified positively or negatively and can also allow for left and/or top adjustment, or right and/or bottom adjustments respectively.

In Step 511 of FIG. 18 each of the template tolerances are tabulated. Finally, the sub-routine is complete at Step 512.

In Step 80 of FIG. 3, a procedure entitled "Allocate Sewing Instructions" is executed. Here, the sewing instructions and related diagrams are allocated into the memory 101 of FIG. 9 for each template in a form ready for printing by a plotter 108. The sewing guides and instructions on the templates include for example, pleat positioning and information about where the common template edges occur.

In Step 90 of FIG. 3, a sub-routine entitled "File Template Coordinates" is executed. This involves storing the (x,y) coordinates of each finished template into a disk file ready for printing.

In Step 100 of FIG. 3, the "Computational Transformation" of Step 3 is completed.

In Step 4 of FIG. 1 entitled "Print Templates", the templates and sewing instructions which have been generated by the computational transformation of Step 3 are plotted using a plotter 108 as shown in FIG. 9. This enables actual (life) sized paper templates to be produced which can then be used as a guide for cutting pieces of fabric which are then sewn together to form the cover. If the furniture is symmetrical, these templates are usually only needed to be produced for half of the furniture since mirror images of each of the templates can be used for the corresponding other halves. For example (i) Front Arm (ii) Front Bottom (iii)Platform (seat)

(iv) Inside Back (v) Outside Back (vi) Outside Arm; and (vii)Inside Arm.

It is to be noted however that the process can apply equally to non-symmetrical furniture if the above "mirroring" arrangement is inappropriate.

Figure 7:
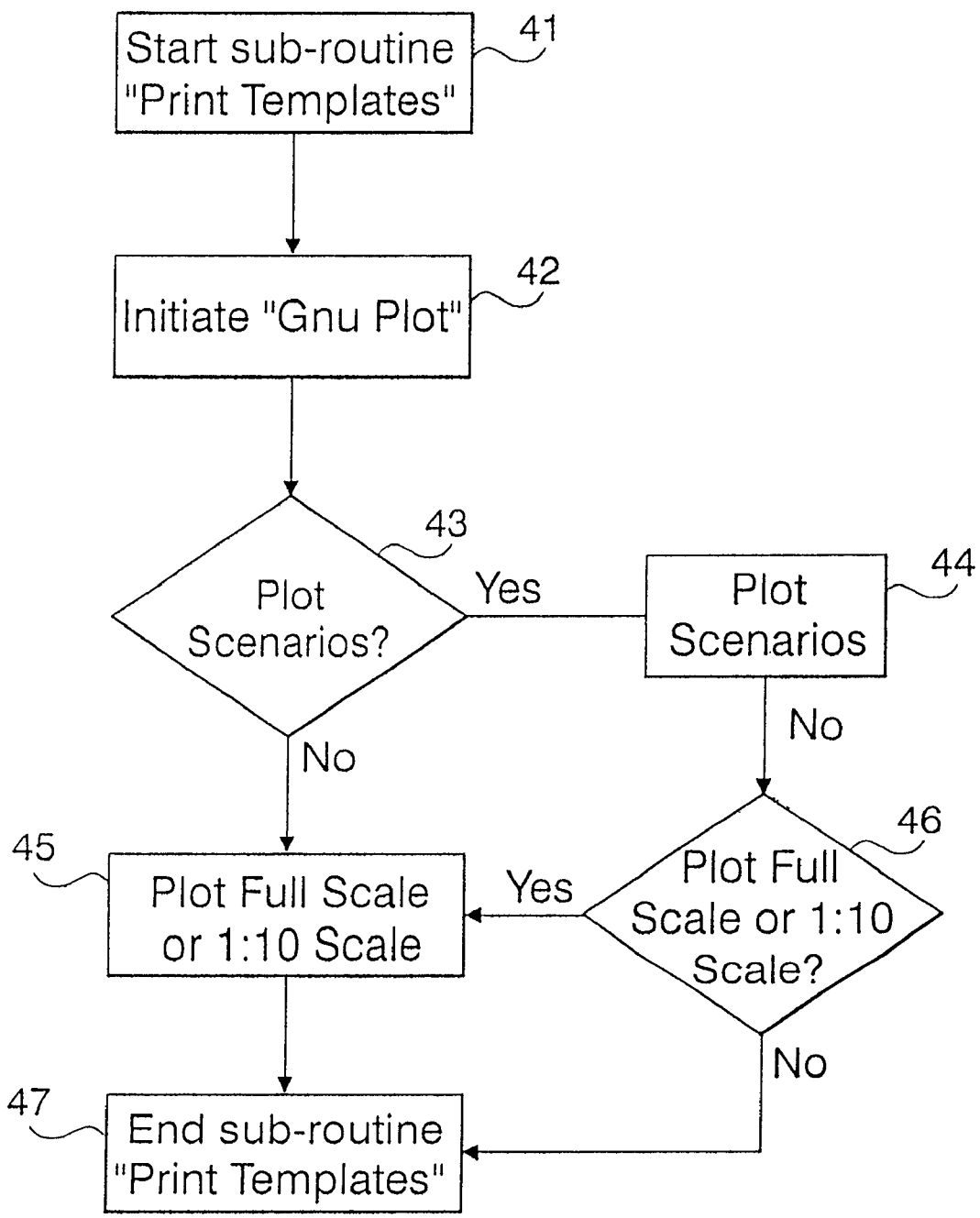
FIG. 7 is a flow chart for explaining the "file template coordinates" subroutine used in the main computer procedure of FIG. 3.

Step 4 of FIG. 1 entitled "Print Templates" will now be described in more detail with reference to FIG. 7.

Step 41 calls the sub-routine, which passes to Step 42 entitled Initiate GNU Plot.

GNU Plot is a dedicated software package for printing each of the disk files created in sub-step 80 to a plotter 108 in FIG. 9. This package allows life size diagrams of template files to be plotted as well as templates to a scale of 1:10 for convenient handling and overall viewing. In addition, scenario views of the furniture can be included to show the scenario of different material patterns and contours in the context of the customer's present decor.

After Step 42, a decision at Step 43 is made in relation to whether scenario views of the furniture are to be plotted. In the case of these not being required, then Step 45 is executed. Here the templates are plotted to full scale or are 1:10 scale after which the sub-routine is finished Step 47.

If however the decision at Step 43 is to plot the scenarios, then the program passes to Step 44 where the scenarios are plotted. Next a decision is made at Step 46 as to whether full scale or 1:10 scale templates are printed. In the case of yes the sequence follows to Step 45. In the case of full scale or 1:10 scale not being plotted then the sub-routine is completed at Step 47.

In Step 5 of FIG. 1, entitled "Manufacture Product", the loose furniture cover is physically manufactured. Fabric is cut manually from the outline of the life-size templates generated by Step 4. The cutting process can be enhanced with automatic laser technology using positioning equipment similar to that used for graph plotters and glass cutters. During manufacture and where appropriate, zippers can be used to join the two halves at strategic positions for ease of fitting.

In Step 6 of FIG. 1 entitled "Measure and Check Finished Product", the internal dimensions of the completed loose cover are measured. This provides feedback as to whether the templates have allowed for an appropriate tolerance (for stitching etc.). This feedback is used to refine the computer program and increase the accuracy of the templates. Step 6 is also concerned with. checking that the cover has been assembled correctly and is generally suitable for delivery.

In a further embodiment, the printing of the templates may be omitted and the output of the computer program provided direct to an automated cutting machine which may then cut the cover material directly.

It will be apparent from the foregoing that the present invention enables a cover to be formed for an article based upon initial measurements of the article and without trial and error that has plagued prior art methods. In the preferred embodiment, the measurements, data entry, computer operation, printing and cutting can be undertaken by persons of lower skill than an upholsterer, whose energies may then be devoted to assembly of the cut cloth to form the cover. Further, the computer program can be supplied in the form of a floppy (magnetic) disk or an optical disk which may be loaded onto the computer 110 via appropriate I/O devices.

Alternatively, the program and/or data may be downloaded from a computer network, such as the Internet, via the communication link 112. Articles manufactured using the computer program and/or other devices, such as printers and cutting machines, such as cut pieces of material, also form an advantageous result in that volume numbers of covers can be manufactured essentially simultaneously.

The foregoing describes only one embodiment of the present invention, and modifications, obvious to those skilled in the art can be made thereto without departing from the scope of the present invention. A number of aspects of the present invention, which are intended to identify, but not necessarily limit, the scope of the present disclosure, are summarized in the following claims.

The present invention may be incorporated into an alternative embodiment, which has a design process portion, a cover production process portion, and a measurement guidance process portion, as described immediately below, and which are shown in FIGS. 19–24:

Design. The shapes of curves are assembled with pointers to the coordinates of the end points of the curves for each template. These settings are by parameter and are only required once for each style.

Cover Production. The parameters stored in the design phase are now used together with input dimensions to produce all the templates needed for production of the covers.

Measurement Guidance. The data base (FIG. 11) containing the dimensions is analyzed to provide guidance and verification of input data.

What is claimed is:

1. A method of manufacturing a cover for an article of furniture, said method comprising the steps of:

ascertaining dimensional data of said article, and relating said data to individual portions of said article, determining a group of physically inter-related templates associated with said portions, each said template being definable on a plane of co-ordinates and being derived from a series of mathematical functions evaluated using said data, generating curves for each said template using points on each curve and defining each curve by a mathematical formula, and, using each said template to form a corresponding cover piece and joining the cover pieces to form said cover.

2. A method as claimed in claim 1 wherein said cover is manufactured from one or more flexible materials, said article of furniture including at least one concave portion and/or at least one convex portion.

3. A method as claimed in claim 2 wherein said flexible materials are selected from the group consisting of fabrics, leather, animal hides, and plastics materials.

4. A method as claimed in claim 2 wherein, at least one of said templates includes tuck-aways, which tuck under said article, and/or turn-unders which are tied under said article.

5. A method as claimed in claim 2 wherein, said templates include allowances for the extension of stretch material.

6. A method as claimed in claim 1, wherein at least one of said portions is three-dimensional, and said cover envelopes predetermined surfaces of said article.

7. A method as claimed in claim 6 wherein one of said templates associated with said three-dimensional portion includes information about pleats.

8. A method as claimed in claim 1 wherein, said article comprises a cushion for said article of furniture.

9. A method as claimed in claim 1 wherein, said templates include valances, which appear as a skirt in a lower portion of said article of furniture.

10. A method as claimed in claim 1 wherein, said templates are connected together and constructed as composite templates.

11. A method as claimed in claim 1, wherein said templates include information to enable the physical inter-relationship therebetween to be realized by sew fastening together of said templates.

12. A method as claimed in claim 11, wherein said information includes seams.

13. A method as claimed in claim 11, wherein said information includes positioning tabs.

14. A method of manufacturing a cover for an article of furniture comprising the steps of:

ascertaining dimensional data of said article along 2 dimensional planes and relating said data to individual portions of said article, choosing and measuring vertical and horizontal end points for each curve on said article of furniture, defining each curve by a code, formulating templates from said data, end points and the code for each curve, said templates being associated with said individual portions and each said template is definable on a plane of co-ordinates derived from a series of mathematical functions; and using each said template to form a corresponding cover piece and joining the cover pieces to form said cover.

15. The method of claim 14 in which each curve is defined by a three part format and allocated a data name, the first part identifying the curve and the second and third parts representing the two end points of the curve.

* * * * *